US012647670B2

(12) United States Patent
Ueda et al.

(10) Patent No.: US 12,647,670 B2
(45) Date of Patent: Jun. 2, 2026

(54) ELECTRONIC APPARATUS, ITS CONTROL METHOD, AND STORAGE MEDIUM

(71) Applicant: CANON KABUSHIKI KAISHA, Tokyo (JP)

(72) Inventors: Haruhisa Ueda, Kanagawa (JP); Nagisa Yanagibashi, Kanagawa (JP); Taro Fuchigami, North Point (HK); Takahiro Akimoto, Kanagawa (JP); Yoshitaka Hashimoto, Kanagawa (JP); Takayuki Iwasa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 149 days.

(21) Appl. No.: 18/403,544

(22) Filed: Jan. 3, 2024

(65) Prior Publication Data

US 2024/0137643 A1 Apr. 25, 2024
US 2024/0236476 A9 Jul. 11, 2024

Related U.S. Application Data

(63) Continuation of application No. PCT/JP2022/015778, filed on Mar. 30, 2022.

(30) Foreign Application Priority Data

Jul. 5, 2021 (JP) ................................. 2021-111750

(51) Int. Cl.
H04N 23/62 (2023.01)
G03B 17/02 (2021.01)
(Continued)

(52) U.S. Cl.
CPC ............. *H04N 23/62* (2023.01); *G03B 17/02* (2013.01); *G06F 3/0362* (2013.01); *H04N 23/631* (2023.01)

(58) Field of Classification Search
CPC .... H04N 23/62; H04N 23/631; H04N 23/667; G03B 17/02; G06F 3/0362
See application file for complete search history.

(56) References Cited

U.S. PATENT DOCUMENTS

2012/0139880 A1* 6/2012 Shirakawa .............. G06F 3/038
345/184
2017/0364205 A1* 12/2017 Chang .................... H01H 13/83
(Continued)

FOREIGN PATENT DOCUMENTS

JP 2009-093379 A 4/2009
JP 2012-118802 A 6/2012
(Continued)

OTHER PUBLICATIONS

Jan. 18, 2024 PCT/IB/338 (PCT Notification of Transmittal of Translation of the International Preliminary Report on Patentability) from International Application No. PCT/JP2022/015778.
(Continued)

*Primary Examiner* — Christopher K Peterson
(74) *Attorney, Agent, or Firm* — Cowan, Liebowitz & Latman, P.C.

(57) ABSTRACT

An electronic apparatus includes an operation member that is rotationally operable, a rotational operation detector configured to detect a rotational operation onto the operation member, a touch operation detector configured to detect a touch operation onto the operation member, a state detector configured to detect a state of the electronic apparatus, and a processor configured to execute the instructions to execute a function in accordance with the rotational operation and the touch operation, and change setting about the rotational operation and the touch operation in accordance with the state.

24 Claims, 14 Drawing Sheets

(51) Int. Cl.
G06F 3/0362        (2013.01)
H04N 23/63        (2023.01)

(56)                References Cited

U.S. PATENT DOCUMENTS

2020/0012356 A1*   1/2020  Horikawa ............. G06F 3/0362
2023/0076700 A1*   3/2023  Mitsumori .......... G06F 3/04883

FOREIGN PATENT DOCUMENTS

| | | |
|---|---|---|
| JP | 2014-203348 A | 10/2014 |
| JP | 2015-232844 A | 12/2015 |
| JP | 5882721 B2 | 3/2016 |
| JP | 2016-206358 A | 12/2016 |
| JP | 2018-005763 A | 1/2018 |
| JP | 2019-186872 A | 10/2019 |
| JP | 6676807 B2 | 4/2020 |
| WO | 2015/072166 A1 | 5/2015 |

OTHER PUBLICATIONS

Jan. 18, 2024 PCT/IB/373 (PCT International Preliminary Report on Patentability) from International Application No. PCT/JP2022/015778.
Jan. 18, 2024 PCT/ISA/237 (PCT Written Opinion of the International Searching Authority) from International Application No. PCT/JP2022/015778.
International Search Report of International Application No. PCT/JP2022/015778 issued on Jun. 21, 2022, which is enclosed.

* cited by examiner

| STATE | A | B | C |
|---|---|---|---|
| GRIP DETECTOR | GRIP DETECTION | NON-DETECTION | GRIP DETECTION |
| EYE PROXIMITY DETECTOR | EYE PROXIMITY DETECTION | NON-DETECTION | NON-DETECTION |
| | → | → | → |
| ROTATIONAL OPERATION FUNCTION | ROTATIONAL OPERATION DETECTION "ON" CLICK FORCE "WEAK" | ROTATIONAL OPERATION DETECTION "OFF" CLICK FORCE "STRONG" | ROTATIONAL OPERATION DETECTION "OFF" CLICK FORCE "STRONG" |
| TOUCH OPERATION FUNCTION | TOUCH DETECTION "OFF" (OR SENSITIVITY "WEAK") | TOUCH DETECTION "OFF" (OR SENSITIVITY "WEAK") | TOUCH DETECTION "ON" (OR SENSITIVITY "STRONG") |

FIG. 7A

| STATE | D | E | F | G | H |
|---|---|---|---|---|---|
| ATTITUDE DETECTOR | MOVEMENT ATTITUDE DETECTION | IMAGE CAPTURING DETECTION | | | |
| SOUND DETECTOR | - | QUIET SOUND DETECTION | LOUD SOUND DETECTION | LOUD SOUND DETECTION | LOUD SOUND DETECTION |
| GRIP DETECTOR | - | - | GRIP DETECTION | NON-DETECTION | GRIP DETECTION |
| EYE PROXIMITY DETECTOR | - | - | EYE PROXIMITY DETECTION | NON-DETECTION | NON-DETECTION |
| | → | → | → | → | → |
| ROTATIONAL OPERATION FUNCTION | ROTATIONAL OPERATION DETECTION "OFF" CLICK FORCE "STRONG" | ROTATIONAL OPERATION DETECTION "OFF" CLICK FORCE "STRONG" | ROTATIONAL OPERATION DETECTION "ON" CLICK FORCE "WEAK" | ROTATIONAL OPERATION DETECTION "OFF" CLICK FORCE "STRONG" | ROTATIONAL OPERATION DETECTION "OFF" CLICK FORCE "STRONG" |
| TOUCH OPERATION FUNCTION | TOUCH DETECTION "OFF" (OR SENSITIVITY "WEAK") | TOUCH DETECTION "ON" (OR SENSITIVITY "STRONG") | TOUCH DETECTION "OFF" (OR SENSITIVITY "WEAK") | TOUCH DETECTION "ON" (OR SENSITIVITY "STRONG") | TOUCH DETECTION "ON" (OR SENSITIVITY "STRONG") |

FIG. 7B

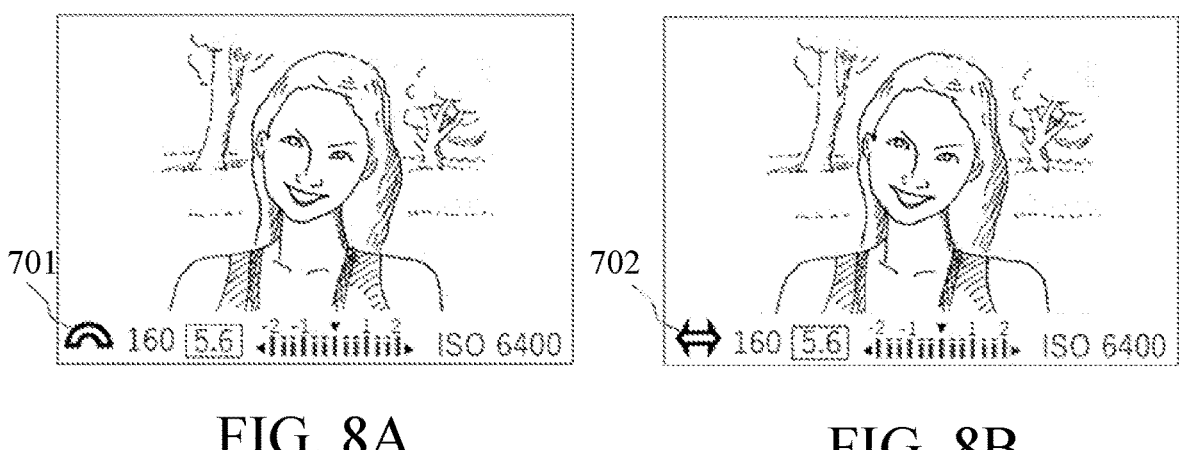
FIG. 8A                    FIG. 8B
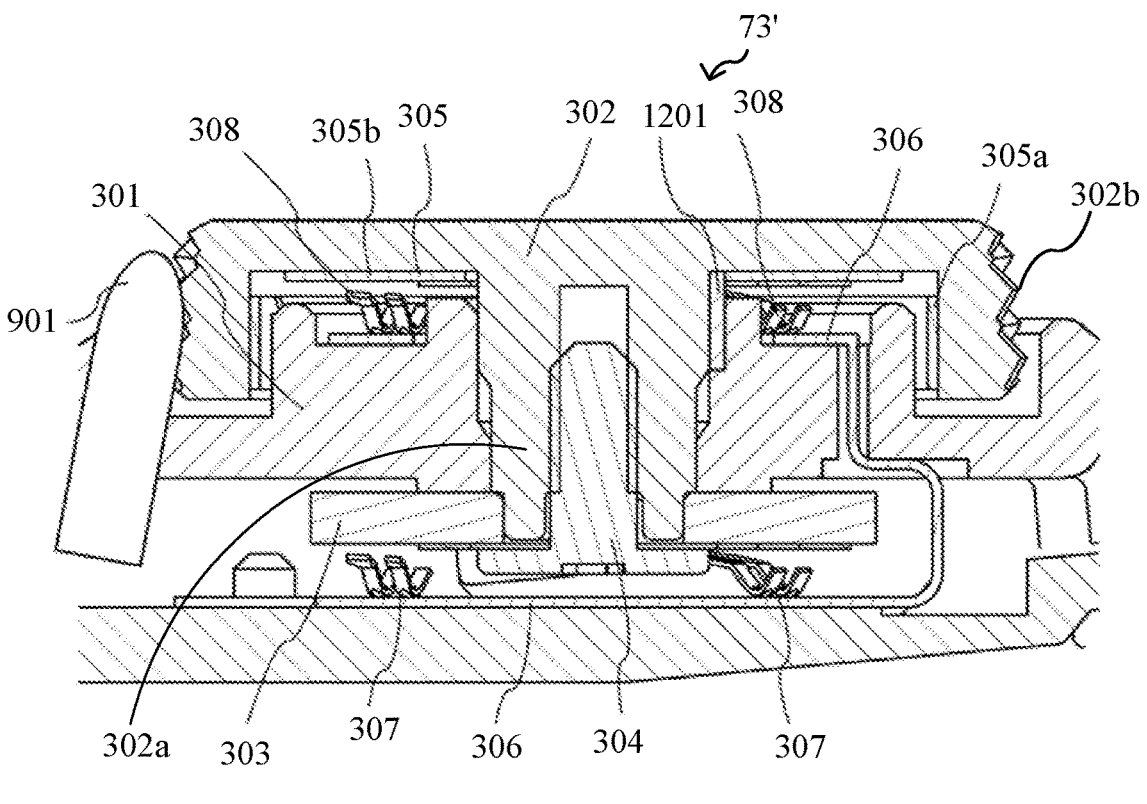
FIG. 9

|  |  | TOUCH DETECTION | ROTATION DETECTION |
|---|---|---|---|
| CONTACT AREA/ EXTERNAL FORCE | SMALL | OFF | OFF |
|  | MEDIUM | ON | OFF |
|  | LARGE | OFF | ON |

ROTATIONAL OPERATION

| THE NUMBER OF FINGERS | FUNCTION (OPERATION) |
| --- | --- |
| 0 | NOT EXECUTED |
| 1 | EXPOSURE CORRECTION VALUE CHANGE |
| 2 | MODE CHANGE |
| 3 | POWER ON/OFF |

FIG. 13A

SLIDE OPERATION

| THE NUMBER OF FINGERS | FUNCTION (OPERATION) |
| --- | --- |
| 0 | - |
| 1 | IMAGE FEED: ONE IMAGE |
| 2 | IMAGE FEED: 10 IMAGES |
| 3 | IMAGE FEED: 100 IMAGES |

ELECTRONIC APPARATUS, ITS CONTROL METHOD, AND STORAGE MEDIUM

CROSS-REFERENCE TO RELATED APPLICATIONS

This application is a Continuation of International Patent Application No. PCT/JP2022/015778, filed on Mar. 30, 2022, which claims the benefit of Japanese Patent Application No. 2021-111750, filed on Jul. 5, 2021, which is hereby incorporated by reference herein in their entirety.

BACKGROUND

Technical Field

One of the aspects of the embodiments relates to an electronic apparatus including an operation unit operated by a user.

Description of Related Art

Japanese Patent No. 6676807 discloses, as an electronic apparatus described above, an image pickup apparatus including a dial on which a rotational operation can be performed and a touch operation unit that can be subjected to a tap operation and a slide operation. In this image pickup apparatus, sound generation can be prevented through an operation of the touch operation unit by a user during moving image capturing, and a stable operation feeling due to a click mechanism can be obtained through an operation of the dial during finder observation or the like.

Japanese Patent No. 5882721 discloses an electronic apparatus (image pickup apparatus) in which a capacitance detector configured to detect capacitance change is provided at the dial to enable a rotational operation and a touch operation onto the operation member.

Japanese Patent Laid-open No. 2016-206358 discloses an image pickup apparatus that includes a lock mechanism configured to lock rotation of the dial and cancels rotation lock of the dial in a case where touch of fingers at two places or more on the dial is detected by using a plurality of touch detection electrodes provided at the dial. The image pickup apparatus stops power supply to the touch detection electrodes and locks rotation of the dial in a case where a rotational operation onto the dial is less likely to be performed, for example, during image capturing in a vertical posture, moving image capturing, or eye proximity to a finder.

However, in the image pickup apparatus disclosed in Japanese Patent No. 6676807, the dial and the touch operation unit are separately provided, which may prevent the image pickup apparatus from being miniaturized.

In the electronic apparatus disclosed in Japanese Patent No. 5882721, a rotational operation and a touch operation onto one operation member are enabled, but clearance including an air layer is provided between the surface of the operation member touched by the user in a touch operation and the capacitance detector. Thus, a signal output from the capacitance detector is unstable depending on the way of touch by the user, and a touch operation (slide operation, in particular) cannot be accurately detected in some cases.

The image pickup apparatus disclosed in Japanese Patent Laid-open No. 2016-206358 has a function only to cancel rotation lock of the dial by detecting touch on the dial by two fingers or more to perform a rotational operation onto the dial. The image pickup apparatus cannot change a setting value nor operation mode of the image pickup apparatus in accordance with a touch operation (slide operation, in particular) on the dial.

SUMMARY

An electronic apparatus according to one aspect of the embodiment includes an operation member that is rotationally operable, a rotational operation detector configured to detect a rotational operation onto the operation member, a touch operation detector configured to detect a touch operation onto the operation member, a state detector configured to detect a state of the electronic apparatus, a memory storing instructions, and a processor configured to execute the instructions to execute a function in accordance with the rotational operation and the touch operation, and change setting about the rotational operation and the touch operation in accordance with the state.

An electronic apparatus according to another aspect of the embodiment includes an operation member that is rotationally operable, a rotational operation detector configured to detect a rotational operation onto the operation member, a touch operation detector configured to detect a touch operation onto the operation member, an operation state detector configured to detect an operation state of the operation member, a memory storing instructions, and a processor configured to execute the instructions to execute a function in accordance with the rotational operation and the touch operation, and change setting about the rotational operation and the touch operation in accordance with the operation state.

A control method corresponding to each of the above electronic apparatuses also constitutes another aspect of the embodiment. A storage medium storing a program that causes a computer to execute the above control method also constitutes another aspect of the embodiment.

Further features of the disclosure will become apparent from the following description of embodiments with reference to the attached drawings.

BRIEF DESCRIPTION OF THE DRAWINGS

FIGS. 7A and 7B illustrate the correspondence between the state of the camera and a function of the sub electronic dial unit in Example 1.

FIGS. 8A and 8B illustrate an example of function display in the sub electronic dial unit according to Example 1.

FIG. 9 is a sectional view of a sub electronic dial unit according to Example 2.

FIGS. 13A and 13B illustrate the correspondence between the number of fingers performing a rotational operation or slide operation onto the dial and a function of the camera in Example 3.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Figure 1A:
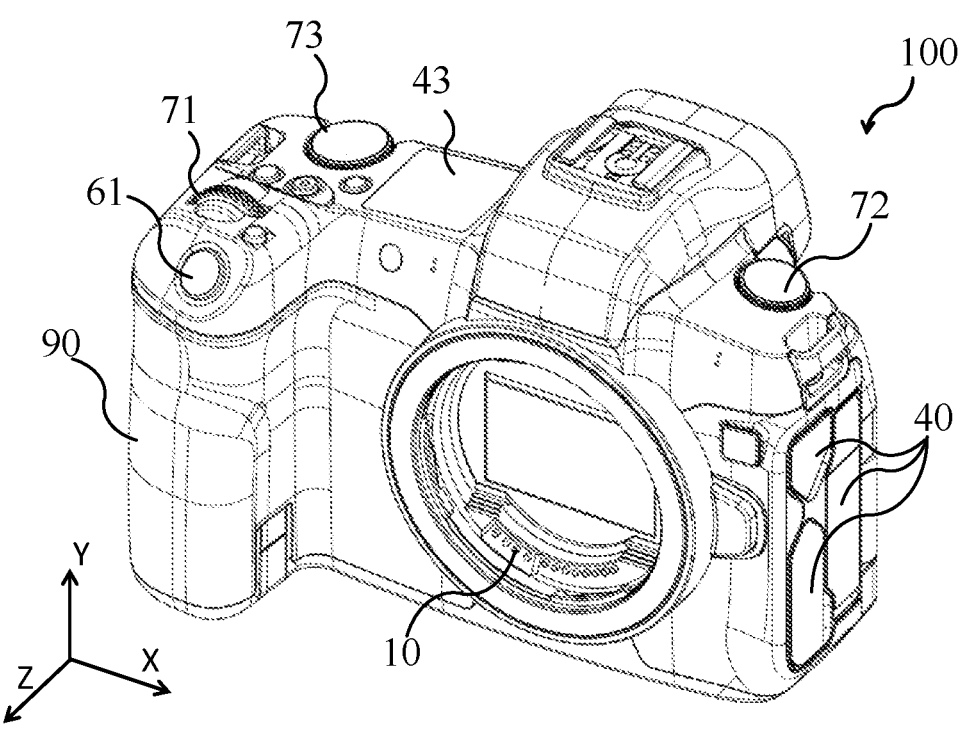
FIGS. 1A and 1B are exterior diagrams of a digital camera according to an example.
Figure 1B:
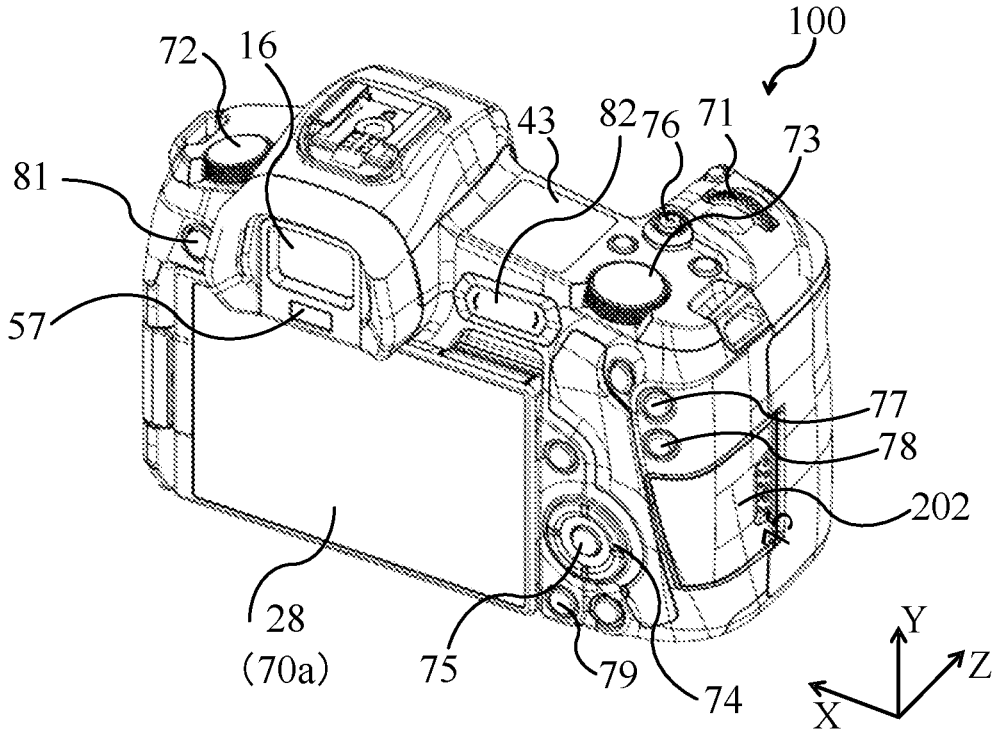
Figure 2:
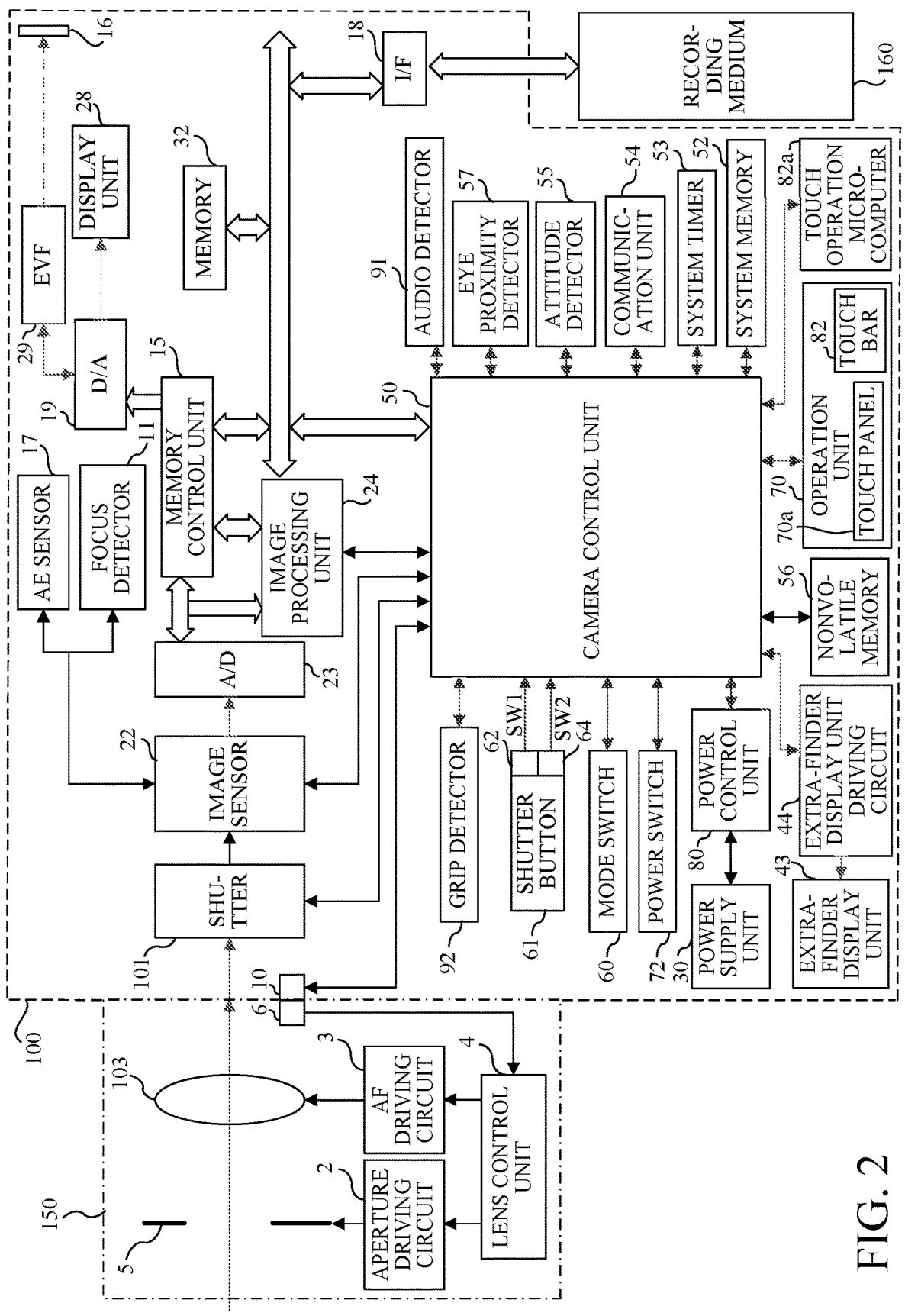
FIG. 2 is a block diagram illustrating the configuration of the digital camera according to the example.

Illustrative embodiments will be described below with reference to the accompanying drawings. FIGS. 1A and 1B illustrate the front-surface-side appearance and back-surface-side appearance, respectively, of a lens interchangeable digital camera (simply referred to as a camera hereinafter) 100 as an electronic apparatus according to one example of the disclosure. FIG. 2 illustrates the internal configurations of the camera 100 and a lens unit (interchangeable lens) 150 mounted on a mount unit.

A display unit 28 provided on the back surface of the camera 100 includes an LCD panel, an organic EL panel, or the like and displays a live-view image, captured images (still and moving images), and various kinds of information including a menu screen. A touch panel 70*a* is provided on a display surface (operation surface) of the display unit 28 and can detect a touch operation onto the display surface by a user. The touch panel 70*a* is included in an operation unit 70 illustrated in FIG. 2. An extra-finder display unit 43 is provided at an upper surface of the camera 100 and displays setting values of shutter speed, an aperture value (F-number), and the like.

A power switch 72 is operated by the user to power on and off the camera 100. A mode switch 60 illustrated in FIG. 2 is operated by the user to switch various modes such as a still image capturing mode, a moving image capturing mode, and a playback mode.

The still image capturing mode includes an automatic imaging mode, an automatic scene determination mode, a manual mode, an aperture prioritized mode, a shutter speed prioritized mode, and a programmed AE mode. The user can select any of these modes through an operation of the mode switch 60. A selection screen for the above modes may be displayed on a menu screen so that either mode can be selected through an operation of an operation member (for example, a sub electronic dial unit 73 to be described below) other than the mode switch 60. Similarly, the moving image capturing mode includes a plurality of modes and either mode can be selected in the same manner as the still image capturing mode.

A shutter button 61 is operated by the user to instruct still image capturing in the still image capturing mode. A first shutter switch 62 and a second shutter switch 64 illustrated in FIG. 2 are turned on by a halfway press operation and a full press operation, respectively, of the shutter button 61. A camera control unit 50 as a control unit illustrated in FIG. 2 controls image capturing preparation operation, which includes auto-exposure (AE) and autofocus (AF), in accordance with turn-on of the first shutter switch 62 (inputting of a signal SW1). The camera control unit 50 performs still image capturing in accordance with turn-on of the second shutter switch 64 (inputting of a signal SW2).

The operation unit 70 illustrated in FIG. 2 includes a main electronic dial unit 71 and the sub electronic dial unit 73 illustrated in FIGS. 1A and 1B in addition to the touch panel 70*a*. The operation unit 70 also includes a directional pad 74, a set button 75, a motion image button 76, an AE lock button 77, a magnification button 78, a playback button 79, a menu button 81, and a touch bar 82.

The main electronic dial unit 71 and the sub electronic dial unit 73 each include a dial as an operation member that can be subject to a rotational operation by the user. Through a rotational operation onto the dial of the main electronic dial unit 71, the setting values of the shutter speed, the aperture value, or the like can be changed. Through a rotational operation onto the dial of the sub electronic dial unit 73, a selected region of an AE region, an AF region, or the like can be moved or image feed can be performed to switch images displayed on the display unit 28.

The directional pad 74 is a four-directional key with an upper part, a lower part, a left part, and a right part that can be each subject to a press-down operation, the four-directional key. An item can be switched or selected in accordance with a part of the directional pad 74 subjected to a press-down operation by the user while a menu screen is displayed on the display unit 28. The set button 75 is operated by the user for determination of a selected item or the like.

The motion image button 76 is operated by the user to instruct start or stop of moving image capturing (recording) in the moving image capturing mode. The AE lock button 77 is operated by the user to fix exposure in an image capturing wait state. The magnification button 78 is operated by the user to turn on or off a magnification mode while a live-view image is displayed. After the magnification mode is turned on, the live-view image can be scaled up or down by operating the main electronic dial unit 71. A captured image displayed in playback can be magnified or the magnification can be increased by operating the magnification button 78 in the playback mode.

The playback button 79 is operated by the user to switch between a still-image/moving-image capturing mode and the playback mode. In a case where the playback button 79 is operated in the still-image/moving-image capturing mode, transition to the playback mode occurs and the latest image among captured images recorded in a recording medium 160 can be displayed on the display unit 28. The menu button 81 is operated by the user to display a menu screen on the display unit 28.

The touch bar 82 is a linear touch operation member (line touch sensor) configured to receive a touch operation by the user and provided separately from the touch panel 70*a*. The user can perform, as a touch operation onto the touch bar 82, a tap operation (operation of touching with a finger and then removing the finger without changing a touch position in a predetermined time) or a slide operation (operation of touching with a finger and then moving the finger while touching) in the right-left direction. The touch bar 82 in this example is a capacitive touch sensor. However, the touch bar 82 may be a touch sensor of another scheme such as a resistance film scheme, a surface acoustic wave scheme, an infrared scheme, an electromagnetic induction scheme, an image recognition scheme, or a light sensor scheme.

The touch bar 82 outputs a detection signal (hereinafter referred to as a capacitance signal) in accordance with capacitance to a touch operation microcomputer 82*a*. The capacitance signal from the touch bar 82 changes as the user touches (performs a touch operation onto) the touch bar 82. The touch operation microcomputer 82*a* determines (detects), based on the change in the capacitance signal, which of a tap operation, a slide operation in the right direction (referred to as a right slide operation hereinafter), and a slide operation in the left direction (hereinafter referred to as a left slide operation) is performed among touch operations to the touch bar 82. Then, the touch operation microcomputer 82*a* outputs a result of the determination to the camera control unit 50. The camera control unit 50 performs change in various setting values or the like in accordance with the kind of the touch operation input from the touch operation microcomputer 82*a*.

As illustrated in FIGS. 1A and 1B, a grip portion 90 is a part gripped by the user with the right hand to hold the camera 100. The shutter button 61 and the main electronic dial unit 71 are disposed at positions where an operation with the forefinger of the right hand is possible while the grip portion 90 is gripped with the little finger, the ring finger, and the middle finger of the right hand, and the sub electronic dial unit 73 and the touch bar 82 are disposed at positions where an operation with the thumb of the right hand is possible.

A grip detector 92 illustrated in FIG. 2 is a sensor configured to detect gripping of the grip portion 90 by the user and is, for example, a capacitive touch sensor or a pressure-sensitive sensor (piezoelectric element). The camera control unit 50 performs, for example, control to enable or disable some operation members included in the operation unit 70 in accordance with detection or non-detection by the grip detector 92.

An audio detector 91 is a microphone configured to detect sound. The camera control unit 50 records sound detected by the audio detector 91 in an internal memory or the recording medium 160 with a captured image.

An attitude detector 55 is a sensor configured to detect the attitude (position) and motion of the camera 100 and is, for example, an acceleration sensor or a gyro sensor. The camera control unit 50 controls the orientation of a live-view image or a captured image in accordance with the attitude or motion detected by the attitude detector 55.

An eyepiece 16 is a part viewed by the user looks to see an electronic viewfinder (EVF) 29. The user can see an image or information displayed at the EVF 29 through the eyepiece 16. An eye proximity detector 57 is a sensor configured to detect viewing (eye proximity) of the eyepiece 16 by the user with the face (eye) being close to the eyepiece 16 and is, for example, an infrared proximity sensor. The camera control unit 50 displays the display unit 28 but does not display the EVF 29 while eye proximity is not detected by the eye proximity detector 57, or does not display the display unit 28 but displays the EVF 29 while eye proximity is detected.

A communication terminal 10 is provided in the mount unit for the camera 100 to perform communication with a lens unit 150. A terminal cover 40 is a member protecting an unillustrated connector that is connected to a cable connecting the camera 100 to an external instrument. A lid 170 is a member that closes a slot in which the recording medium 160 is stored.

In FIG. 2, the lens unit 150 includes an image pickup optical system constituted by a plurality of lenses (illustrated as one lens in the diagram) 103 and an aperture stop 1.

An image sensor 22 in the camera 100 includes a CCD sensor, a CMOS sensor, or the like and converts an optical image formed through the image pickup optical system into an electric signal. A shutter 101 is a mechanical shutter (focal plane shutter) configured to control an exposure time of the image sensor 22.

An AE sensor 17 detects the luminance of an object by using an output signal (luminance signal) from the image sensor 22. A focus detector 11 detects a defocus amount by using an output signal (focus detection signal) from the image sensor 22. The camera control unit 50 controls the opening diameter (aperture value) of the aperture stop 1 and the shutter speed based on luminance information from the AE sensor 17 and performs AF control based on defocus amount information from the focus detector 11.

An A/D converter 23 converts an analog image signal from the image sensor 22 into a digital image signal (image capturing data) and outputs the image capturing data to an image processing unit (processing unit) 24 and a memory control unit 15. The image processing unit 24 generates image data by providing the image capturing data from the A/D converter 23 with image processing such as pixel interpolation, resize processing, color conversion processing, and auto-white balance (AWB) processing. The image data is written to a memory 32 through the memory control unit 15 or directly. A D/A converter 19 receives the image data stored in the memory 32 through the memory control unit 15, converts the image data into an analog image signal, and supplies the image data to the display unit 28 and the EVF 29 to display a live-view image.

An extra-finder display unit driving circuit 44 causes on the extra-finder display unit 43 to display various above-described setting values.

A nonvolatile memory 56 is an electrically erasable and recordable memory and is, for example, an EEPROM. The nonvolatile memory 56 stores constants, computer programs, and the like for operation of the camera control unit 50. The camera control unit 50 is a computer constituted by a processor and a peripheral circuit and controls the entire operation of the camera 100 and the lens unit 150 by executing a computer program stored in the nonvolatile memory 56 and loaded onto a system memory 52 such as a RAM.

A system timer 53 measures a time used for various kinds of control performed by the camera control unit 50 and the time of a built-in clock.

A power control unit 80 includes a battery detection circuit, a DC-DC converter, and a switch circuit configured to switch blocks to be energized. The battery detection circuit detects whether a battery is mounted, the kind of the battery, and the remaining amount of the battery. The power control unit 80 and controls the DC-DC converter and the switch circuit based on the remaining amount of the battery and an instruction from the camera control unit 50 and supplies needed voltage to blocks including the recording medium 160 for a needed duration.

A power supply unit 30 includes a primary battery such as an alkaline battery or a lithium battery, a secondary battery such as a NiCd battery, a NiMH battery, or a Li battery, or an AC adapter. A recording medium I/F 18 is an interface to the recording medium 160 such as a semiconductor memory card or a hard disk. A communication unit 54 is connected wirelessly or through a wired cable and transmits and receives image and sound signals.

The communication unit 54 performs communication of a captured image, a live-view image, or other information with an external instrument through a wireless LAN, the Internet, Bluetooth (registered trademark), Bluetooth Low Energy (registered trademark), or the like.

In the lens unit 150, a communication terminal 6 is provided for a lens control unit 4, which is provided in the lens unit 150, to perform communication with the camera control unit 50 through the communication terminal 10 on the camera side. The camera control unit 50 performs AF by driving the aperture stop 1 through control of an aperture driving circuit 2 through the lens control unit 4 and driving the lenses (focus lenses) 103 through control of an AF driving circuit 3. The sub electronic dial unit 73 in this example will be described below in more detail. The sub electronic dial unit 73 can receive not only a rotational operation onto the dial but also the same touch operations (a tap operation, a right slide operation, and a left slide operation) as the touch bar 82 on an outer circumferential surface (outer surface) that is a side surface of the dial about the rotational center. The tap operations also include a tap operation in a right tap range (hereinafter referred to as a right tap operation) on the right side (first side) and a tap operation in a left tap range (hereinafter referred to as a left tap operation) on the left side (second side opposite the first side) on the outer circumferential surface of an operable portion of the dial to be described below.

A touch operation onto the outer circumferential surface of the dial is detected by a capacitive touch sensor (hereinafter referred to as a dial touch sensor) provided on the inner circumferential surface (inner surface) of the dial. Similarly to the touch bar 82, the dial touch sensor outputs a capacitance signal that is a detection signal in accordance with capacitance to the touch operation microcomputer 82a. A touch operation detector includes the dial touch sensor and the touch operation microcomputer 82a.

As the user performs a touch operation onto the outer circumferential surface of the dial, the capacitance at the dial touch sensor changes and the capacitance signal output from the dial touch sensor changes. The change in the capacitance at the dial touch sensor due to the touch operation may be increase or decrease, but a case of the increase will be described below.

The touch operation microcomputer 82a determines which of a right tap operation, a left tap operation, a right slide operation, and a left slide operation is performed on the dial based on the change in the capacitance signal from the dial touch sensor, and outputs a result of the determination (the kind of the touch operation) to the camera control unit 50. The camera control unit 50 performs, based on the above-described computer program, change and the like of various setting values in accordance with the kind of the touch operation input from the touch operation microcomputer 82a. The camera control unit 50 also performs the above-described selected region movement or image feed in accordance with a rotational operation onto the dial.

The kind of the touch operation may be determined by inputting the capacitance signal from the dial touch sensor to a microcomputer different from the touch operation microcomputer 82a to which the capacitance signal from the touch bar 82 is input.

The sub electronic dial unit 73, which can receive a rotational operation and a touch operation onto one dial, is provided for the following reason. For example, in performing a rotational operation onto the dial to perform still image capturing while viewing into the eyepiece 16, the user obtains a click feeling (operation feeling) due to a click mechanism in the sub electronic dial unit 73 and thus can perform a stable operation without viewing the dial. However, sound (click sound) is generated from the click mechanism due to the rotation of the dial. The sound generation can be prevented by performing a touch operation onto the dial at moving image capturing.

In this example, the touch bar 82 on which a touch operation is possible is provided separately from the sub electronic dial unit 73 on which a touch operation is possible, but the touch bar 82 may be omitted.

Example 1

Figure 3:
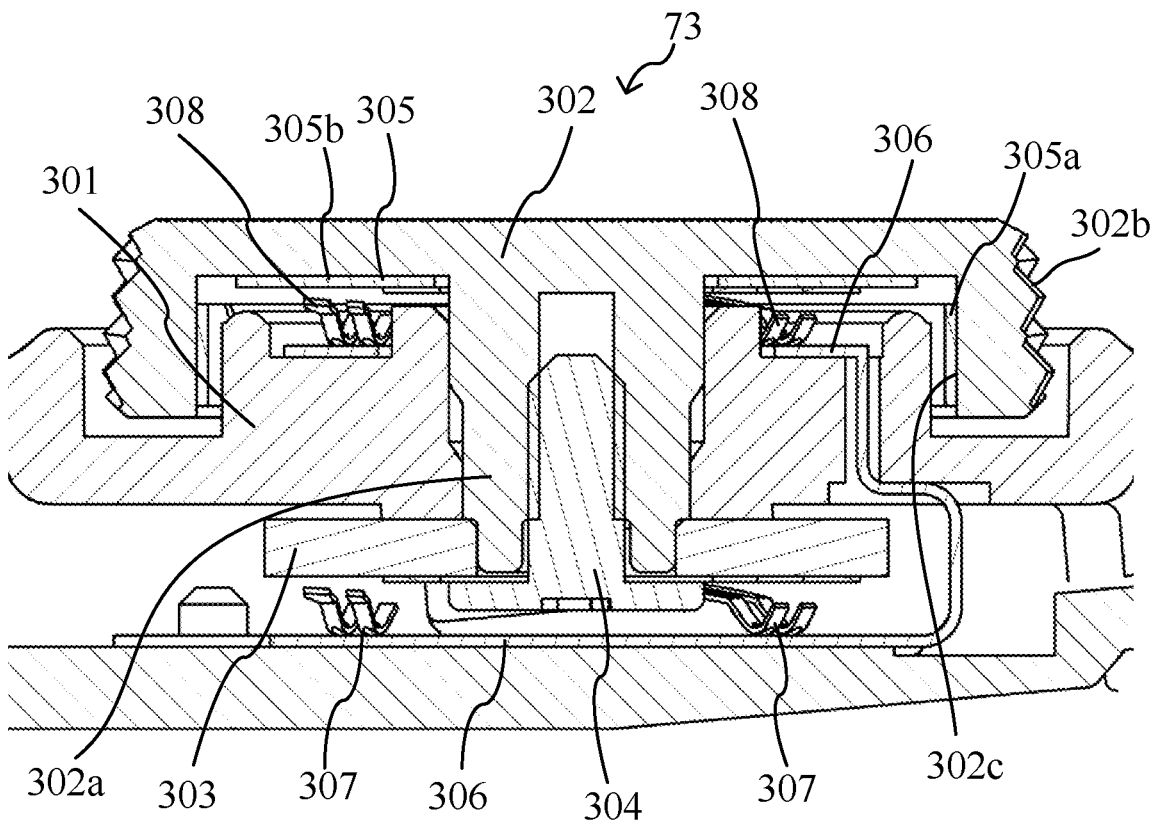
FIG. 3 is a sectional view of a sub electronic dial unit according to Example 1.

FIG. 3 illustrates a section of the sub electronic dial unit 73 in Example 1. The sub electronic dial unit 73 includes a dial 302, a click plate 303, the unillustrated click mechanism, a first flexible substrate (first flexible printed circuit: first FPC) 305, a second flexible substrate (second FPC) 306, a rotation detection contact piece 307, a capacitance detector (capacitance detector) 305a, and a signal transfer contact piece (signal transfer unit) 308.

The dial 302 that is an operation member is formed of a resin material and includes a shaft portion 302a and an outer circumferential surface 302b as a side surface. The resin material of the dial 302 may contain glass fiber or the like for intensity improvement but may contain no conductive material such as carbon.

The shaft portion 302a of the dial 302 is inserted from above into a hole provided through an upper surface part of an upper cover 301 of the camera 100, and the click plate 303 is fixed at a lower end of the shaft portion 302a by a screw 304. Accordingly, the dial 302 and the click plate 303 are rotatably attached to the upper cover 301. The user can perform a rotational operation onto the dial 302 by applying rotational force to the outer circumferential surface 302b of the dial 302 with a finger.

The click plate 303 is formed of a metal such as stainless steel or a resin material such as polyacetal resin (POM) in a circular plate shape, and unillustrated concave and convex parts are alternately formed on its outer peripheral part in the circumferential direction. In a case where the dial 302 is not rotating, a ball of the click mechanism is pressed by a spring and fitted into one concave part. As the dial 302 rotates and the click plate 303 rotates integrally with the dial 302, the ball moves over the convex part and is fitted into the next concave part. Accordingly, a click feeling is provided to the user. However, click sound is generated as described above.

The second flexible substrate (rotation detection substrate) 306 is fixed at a position facing the click plate 303 on a bottom surface part of the upper cover 301. The rotation detection contact piece 307 that is a conductive member for detecting rotation of the dial 302 is fixed to the click plate 303. An unillustrated plurality of rotation detection conductive patterns that the rotation detection contact piece 307 can contact is formed of copper or the like on the second flexible substrate 306. A rotational operation detector includes the rotation detection contact piece 307 and the rotation detection conductive patterns. In other words, (part of) the rotational operation detector is provided on the second flexible substrate 306.

As the click plate 303 rotates together with the dial 302, the rotation detection contact piece 307 becomes a contact (conduction) state or a non-contact (non-conduction) state with the plurality of rotation detection conductive patterns at mutually different timings. The camera control unit 50 detects rotation of the dial 302 and the rotational direction thereof based on change in combination of the contact and non-contact states, and changes a setting value in accordance with the rotation detection.

A photo sensor (interrupter (PI) or photo reflector (PR)) configured to switch, in accordance with rotation of the dial 302 (click plate 303), a state in which light from a light emitting unit is received by a light receiving unit and a state in which the light is not received may be used as a rotation detector. The rotational direction of the dial 302 can be detected by using a plurality of PIs or PRs and differentiating timings at which the PIs or PRs become a light receiving state or a non-light receiving state. In this case, the PIs or PRs are provided on the second flexible substrate 306.

The rotational amount (rotational position) of the dial 302 may be detected and, for example, the above-described modes may be switched in accordance with the rotational position of the dial 302.

The first flexible substrate 305 is fixed inside the dial 302. The first flexible substrate 305 is provided with a capacitance detector 305a fixed to the inner circumferential surface (surface on the back side of the outer circumferential surface 302b) 302c of the dial 302. The capacitance detector 305a is a touch sensor configured to detect capacitance change as the outer circumferential surface 302b of the dial 302 is touched with a finger of the user.

A signal transfer contact piece 308 that is fixed to the dial 302 and integrally rotates with the dial 302 is connected to a wiring portion (or pattern) 305b connected to the capacitance detector 305a on the first flexible substrate 305. The signal transfer contact piece 308 contacts a signal transfer conductive pattern on the second flexible substrate 306 irrespective of the rotational position of the dial 302. Accordingly, the capacitance signal from the capacitance detector 305a is transferred to the signal transfer conductive pattern on the second flexible substrate 306 through the signal transfer contact piece 308 and input to the touch operation microcomputer 82a through the second flexible substrate 306. For example, the camera control unit 50 changes various setting values in accordance with the kind of a touch operation determined by the touch operation microcomputer 82a.

In this manner, the capacitance signal output from the capacitance detector 305a of the rotating dial 302 can be transferred to the touch operation microcomputer 82a through the second flexible substrate 306 provided with the rotation detection conductive patterns.

The shaft portion 302a of the dial 302 may be provided with a wiring pattern through which the capacitance signal from the capacitance detector 305a is transferred from the first flexible substrate 305 to the rotation detection contact piece 307 provided at the click plate 303. In this case, the capacitance signal from the capacitance detector 305a can be transferred to the second flexible substrate 306 through the rotation detection contact piece 307 serving as a rotation detector (part thereof) and a signal transfer unit and can be input to the touch operation microcomputer 82a. Alternatively, a non-contact communication unit of wireless communication, optical communication, or the like may be used as the signal transfer unit to transfer the capacitance signal from the capacitance detector 305a to the second flexible substrate 306 and input the capacitance signal to the touch operation microcomputer 82a.

Figures 4A, 4B:
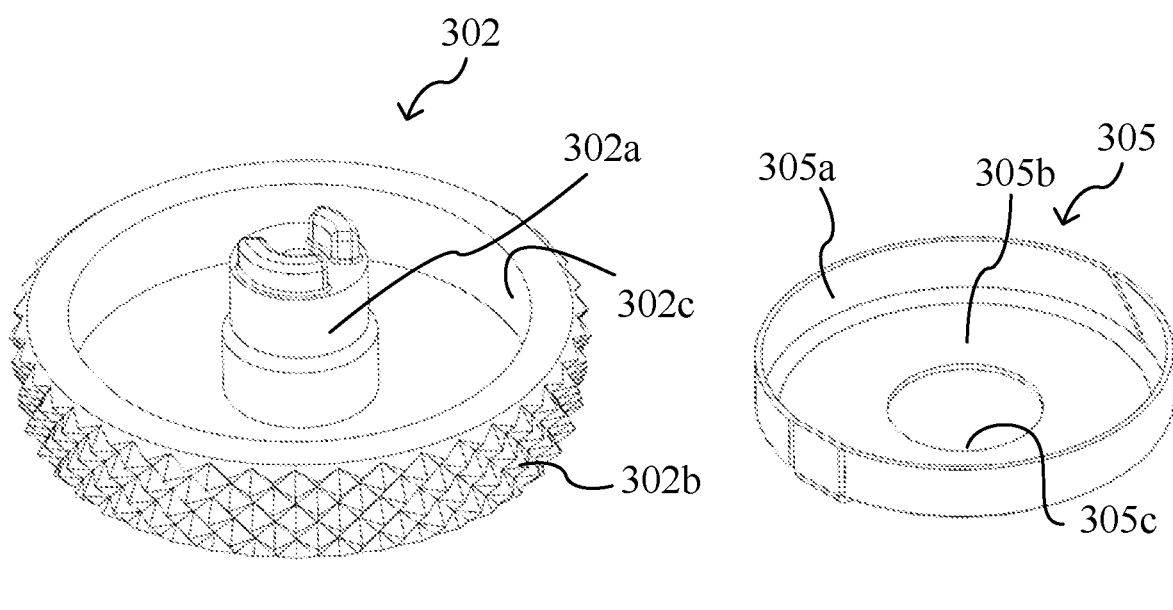
FIGS. 4A, 4B, and 4C are diagrams illustrating a dial and a first flexible substrate (FPC) in Example 1.

FIG. 4A only illustrates the dial 302 when viewed from its bottom surface side. The inside of the dial 302 is a concave part that is opened on the bottom surface side, the shaft portion 302a is provided at the center of the concave part, and a cylindrical part is formed around the concave part. The outer circumferential surface of the cylindrical part is the outer circumferential surface 302b, and the inner circumferential surface thereof is the inner circumferential surface 302c. The outer circumferential surface 302b has a minute web-like irregular (knurled) shape for preventing slipping of a finger of the user.

FIG. 4B only illustrates the first flexible substrate 305 when viewed from the bottom surface side. The first flexible substrate 305 has a shape in which the capacitance detector 305a is provided around a wiring portion 305b in a ring shape.

Figure 4C:
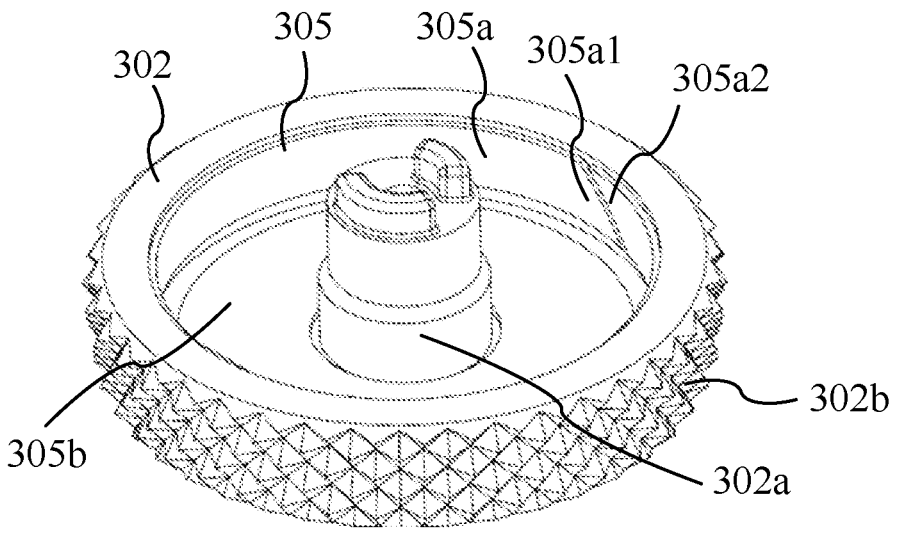

FIG. 4C illustrates a state in which the first flexible substrate 305 is fixed inside the dial 302 by, for example, a double-sided adhesive tape, a bonding agent, or fitting of a protrusion and a protrusion hole. The shaft portion 302a of the dial 302 is inserted into an opening 305c formed at the center of the wiring portion 305b of the first flexible substrate 305, the wiring portion 305b is bonded to a ceiling surface inside the dial 302, and the capacitance detector 305a is bonded to the entire circumference of the inner circumferential surface 302c of the dial 302.

The vicinity of an one end 305a1 of the capacitance detector 305a in the circumferential direction and the vicinity of the other end 305a2 thereof may overlap each other. Although not illustrated in FIGS. 4B and 4C, the signal transfer contact piece 308 that is a conductive member for transferring the capacitance signal from the capacitance detector 305a to the second flexible substrate 306 as described above with reference to FIG. 3 is provided at the wiring portion 305b.

Instead of the configuration in which the dial 302 is fixed to the first flexible substrate 305 separately provided from the dial 302, the capacitance detector 305a and the wiring portion 305b may be integrally shaped with the dial 302. In any case, the capacitance detector 305a only needs to contact the inner circumferential surface 302c on the back side of the outer circumferential surface 302b of the dial 302 directly or through a conductive double-sided adhesive tape or conductive grease that is a conductive member such that no clearance including an air layer is formed between the inner circumferential surface 302c of the dial 302 and the capacitance detector 305a. No air layer formed can prevent capacitance signal variance and S/N decrease in accordance with the way of touch on the outer circumferential surface 302b by the user, thereby stably detecting a touch operation.

As illustrated in FIG. 4B, the capacitance detector 305a serving as a wiring portion may be provided on the ceiling surface inside the dial 302 to detect a touch operation onto an upper surface (top surface) of the dial 302. Specifically, the capacitance detector may be provided in contact with an inner surface on the back side of the outer surface (the outer circumferential surface 302b and the upper surface) of the dial 302 directly or through a conductive double-sided adhesive tape or conductive grease.

Figure 5A:
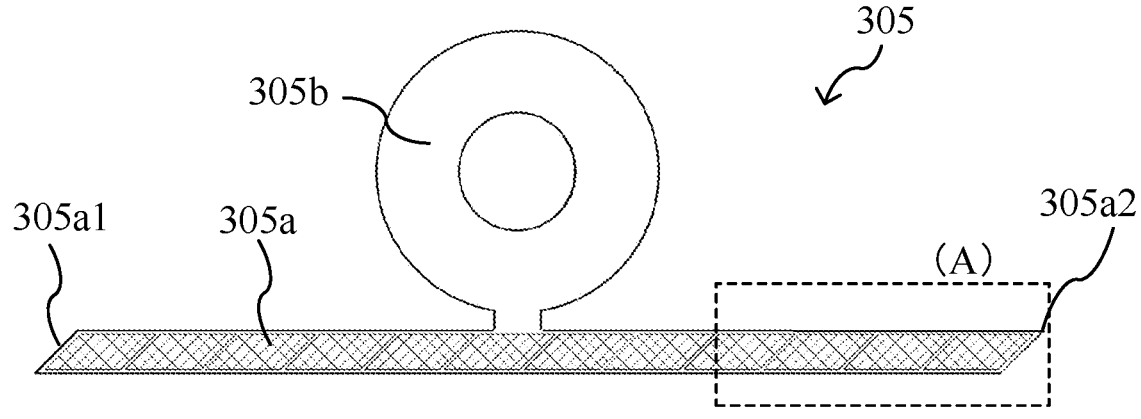
FIGS. 5A and 5B are enlarged views illustrating the first flexible substrate.
Figure 5B:
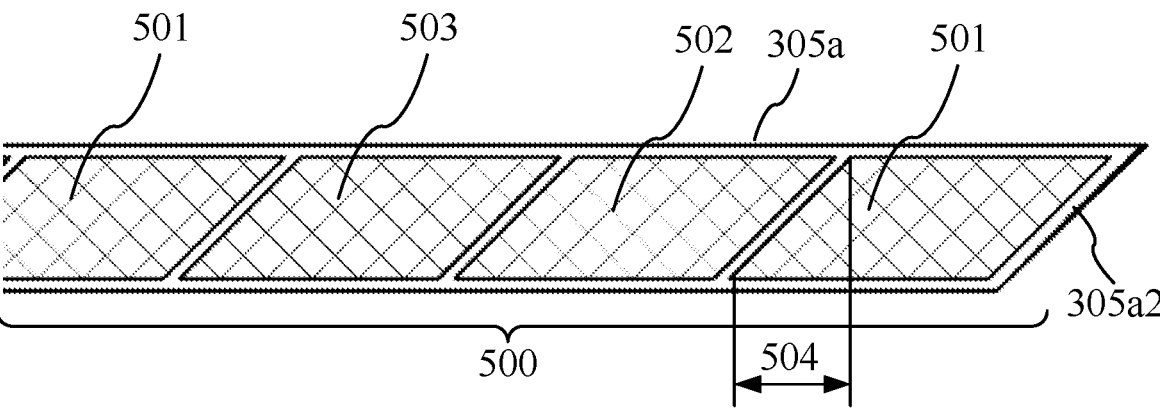

FIG. 5A illustrates the first flexible substrate 305 when exploded in a flat plate shape. FIG. 5B illustrates part A of the capacitance detector 305a in FIG. 5A in an enlarging manner. The capacitance detector 305a is provided with a touch sensor electrode 500 constituting the above-described dial touch sensor. The touch sensor electrode 500 includes a plurality of (first to third) electrodes 501 to 503 formed of a conductive member such as copper and disposed adjacent to each other at a small interval in a longitudinal direction of the capacitance detector 305a (the circumferential direction of the inner circumferential surface 302c of the dial 302: hereinafter referred to as a sensor longitudinal direction). The first, second, and third electrodes 501, 502, and 503 are repeatedly disposed in the stated order from the one end 305a1 of the capacitance detector 305a to the other end 305a2 in the sensor longitudinal direction.

As illustrated in FIG. 5B, each of the first to third electrodes 501 to 503 is formed in a shape including a part 504 overlapping an adjacent electrode in the sensor longitudinal direction. Specifically, both ends of each electrode in the sensor longitudinal direction are formed at a tilt in a direction orthogonal to the sensor longitudinal direction. The one end 305a1 and the other end 305a2 of the capacitance detector are cut along the tilt of both ends of each electrode. With such an electrode shape, the capacitance signal can be stably output wherever a touch operation (tap operation and slide operation) is performed on the outer circumferential surface 302b of the dial 302. In particular, this example can avoid discontinuity of the capacitance signal due to the interval between electrodes in a case where a slide operation is performed, thereby improving detection performance of the slide operation.

Figures 6A, 6B:
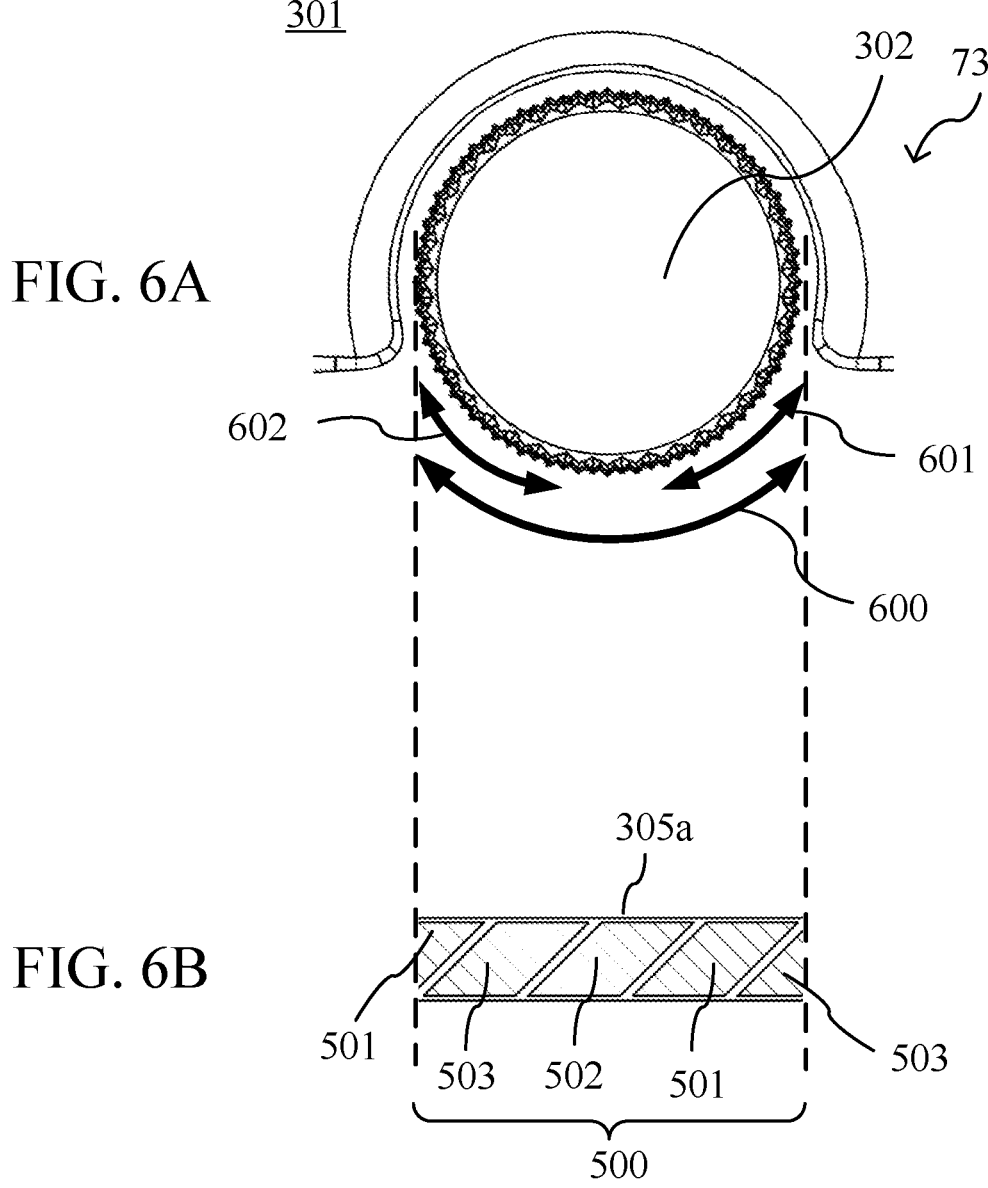
FIGS. 6A and 6B illustrate the positional relation between the sub electronic dial unit and a capacitance detector according to Example 1.

FIG. 6A illustrates the positional relation between the dial 302 and the capacitance detector 305a (the touch sensor electrode 500) when viewed from above. As understood from FIGS. 1A and 1B, the dial 302 is disposed in a concave part provided at the upper cover 301, and part of the outer circumferential surface 302b of the dial 302 is exposed through an opening 600 on the back surface side of the concave part. The user touches the part (hereinafter referred to as an operable portion) of the outer circumferential surface 302b of the dial 302 exposed through the opening 600 with a finger and performs a rotational operation and a touch operation. The operable portion of the dial 302 in this example has an angle range of 120 [degree] approximately about the rotational center of the dial 302. However, the angle range may be 90 [degree] or 180 [degree] and is not particularly limited.

FIG. 6B illustrates the touch sensor electrode 500 provided on the back surface (inner circumferential surface 302c) of the operable portion of the dial 302. As illustrated in the diagram, at least one of each of the first to third electrodes 501 to 503 is provided on the back surface of the operable portion of the dial 302. At least one of each of the first to third electrodes 501 to 503 may be provided on the back surface of the operable portion irrespective of the rotational position of the dial 302.

The rotational position of the dial 302 is determined in a case where the above-described ball is fitted into a concave part of the click plate 303. Thus, the concave parts of the click plate 303 are formed at a circumferential direction pitch with which at least one of each of the first to third electrodes 501 to 503 is provided on the back surface of the operable portion of the dial 302. Accordingly, a tap operation and a slide operation onto the dial 302 can be excellently detected as described below.

Tap Operation

A tap operation is an operation of touching the operable portion of the dial 302 with a finger and then removing the finger without changing a touch position (canceling the touch) in a predetermined time. In FIG. 6A, in a case where a finger of the user touches a right tap range 601 of the operable portion of the dial 302, the touch on the right tap range 601 is detected based on capacitance change at the first electrode 501 illustrated in FIG. 6B. Thereafter, in a case where the finger is removed from the right tap range 601 in the predetermined time, the touch cancellation in the right tap range 601 is detected based on capacitance change at the first electrode 501. With such capacitance (signal) change, the touch operation microcomputer 82a detects a right tap operation and the camera control unit 50 executes a function (operation or control) allocated to the right tap operation.

In a case where a finger of the user touches a left tap range 602 of the operable portion of the dial 302, the touch on the left tap range 602 is detected based on capacitance change at the third electrode 503. Thereafter, in a case where the finger is removed from the left tap range 602 in the predetermined time, the touch cancellation in the left tap range 602 is detected based on capacitance change at the third electrode 503. With such capacitance change, the touch operation microcomputer 82a detects a left tap operation and the camera control unit 50 executes a function allocated to the left tap operation.

A center tap operation using capacitance change at the second electrode 502 may be provided. Moreover, a tap operation may be detected in a case where touch with a finger continues for a first predetermined time or longer after the touch and then the touch is canceled in a second predetermined time.

Slide Operation

A slide operation is an operation of touching the operable portion of the dial 302 with a finger and then moving the finger (touch position) while touching. In a case where a finger of the user touches the right tap range 601 of the operable portion of the dial 302, the touch on the right tap range 601 is detected based on capacitance change (increase) at the first electrode 501. As the finger moves from the right tap range 601 to the left tap range 602 while touching the operable portion, capacitance sequentially changes in the order of the first electrode 501, the second electrode 502, and the third electrode 503, and accordingly, movement of the touch position in the left direction is detected. In a case where the finger is removed from the left tap range 602, the touch cancellation in the left tap range 602 is detected based on capacitance change (decrease) at the third electrode 503. With such capacitance change, the touch operation microcomputer 82a detects a left slide operation and the camera control unit 50 executes a function allocated to the left slide operation.

In a case where a finger of the user touches the left tap range 602 of the operable portion of the dial 302, the touch on the left tap range 602 is detected based on capacitance change at the third electrode 503. As the finger moves from the left tap range 602 to the right tap range 601 while touching the operable portion, capacitance sequentially changes in the order of the third electrode 503, the second electrode 502, the first electrode 501, and accordingly, movement of the touch position in the right direction is detected. In a case where the finger is removed from the right tap range 601, the touch cancellation in the right tap range 601 is detected based on capacitance change at the first electrode 501. With such capacitance change, the touch operation microcomputer 82a detects a right slide operation and the camera control unit 50 executes a function allocated to the right slide operation.

In a case where movement of the touch position is detected after touch (in other words, even though touch cancellation is not detected), the movement may be detected as a slide operation and a function allocated to the slide operation may be executed.

A position initially touched by a finger in right and left slide operations may be a center range corresponding to the second electrode 502 at the operable portion of the dial 302. In this case, in a case where a finger of the user touches the center range, the touch on the center range is detected based on capacitance change at the second electrode 502, and a left slide operation is detected based on sequential change in capacitance in the order of the second electrode 502 and the third electrode 503 as the finger moves in the left direction. In addition, a right slide operation is detected based on sequential change in capacitance in the order of the second electrode 502 and the first electrode 501 as the finger moves in the right direction after the touch on the center range is detected.

The three electrodes (first to third electrodes) are disposed at the operable portion of the dial in this example, but may be two electrodes or four or more electrodes.

This example can accurately detect a touch operation (tap operation and slide operation) on the dial 302 on which a rotational operation can be performed in the camera 100 having a small size.

Switching Between Rotational Operation and Touch Operation

In a case where a rotational operation onto the dial 302 is provided with a click feeling to enable selected region movement or image feed for each click as described above, a false operation is unlikely to occur in a case where the user performs a blind operation while viewing the eyepiece 16, which is an advantage. With a slide operation onto the dial 302, a setting value can be continuously changed, and moreover, a silent operation with which sound such as click sound is not generated is possible, which is an advantage. Thus, a rotational operation function to detect a rotational operation onto the dial 302 and execute a function in accordance with the rotational operation and a touch operation function to detect a touch operation and execute a function in accordance with the touch operation may be switched depending on a state or environment in which the user uses the camera 100.

The camera control unit 50 as a setting unit can detect or determine the state (use state or use environment) of the camera 100 through the attitude detector 55, the eye proximity detector 57, the audio detector 91, and the grip detector 92 as state detectors illustrated in FIG. 2. For example, the use state of the camera 100 such as motion (pan, tilt, lift-up, or carry) or rest can be determined by using acceleration obtained by the attitude detector 55. Specifically, for example, a pan/tilt image capturing state can be determined in a case where acceleration of the camera 100, which is equal to or larger than a threshold value is continuously detected, or a rest state in which the camera 100 is fixed to a tripod or the like or a hand-held image capturing state can be determined in a case where acceleration smaller than the threshold value is detected. In addition, a state in which the user performs image capturing while viewing the eyepiece 16 (while viewing the inside of the electronic apparatus) can be determined by the eye proximity detector 57. In a case where eye proximity is not detected by the eye proximity detector 57, a state in which the user performs image capturing while viewing the display unit 28 (while viewing the outer surface of the electronic apparatus) can be determined. Moreover, in a case where the volume of sound around the camera 100, which is detected by the audio detector 91 is smaller than a threshold value, it can be determined that the use environment is a silent environment. Furthermore, a state in which the user performs image capturing while grasping the grip portion 90 can be determined by the grip detector 92.

FIGS. 7A and 7B illustrate setting about the rotational operation function and the touch operation function in accordance with a detection result of the state of the camera 100. The camera control unit 50 changes, based on the above-described computer program, setting about the rotational operation function and the touch operation function in accordance with the state of the camera 100.

FIG. 7A illustrates ON/OFF (enablement/disablement or detection/non-detection of a rotational operation and a touch operation) of the rotational operation function and the touch operation function in accordance with detection results in a case where grasping (grip) detection by the grip detector 92 and eye proximity detection by the eye proximity detector 57 are enabled. The user can select enablement/disablement of grip detection and eye proximity detection through a menu screen displayed on the display unit 28.

State A is a state in which grip and eye proximity are both detected, and the camera control unit 50 determines the state as a state in which the user grasps the grip portion 90 and performs image capturing while viewing the eyepiece 16. In State A, since the user performs a blind operation onto the dial 302, a false touch operation is likely to be performed. Thus, the camera control unit 50 turns off the touch operation function and turns on the rotational operation function to enable a reliable rotational operation with a click feeling. In this case, sensitivity to a touch operation may be decreased instead of turning off the touch operation function. This is the same for any other state to be described below, in which the touch operation function is turned off. In addition to turning on the rotational operation function, spring force that presses the ball of the click mechanism as a resistance generation unit against a concave part of the click plate 303, that is, resistance against rotation of the dial 302 may be set to be weak (first intensity) so that a rotational operation onto the dial 302 can be easily performed. A configuration for changing the spring force in the click mechanism is not particularly limited, but the spring force may be set to be variable by increasing and decreasing the charge amount of the spring through, for example, a cam mechanism.

This is the same for any other state to be described below, in which the rotational operation function is turned on.

State B is a state in which grip and eye proximity are both not detected, and the camera control unit 50 determines the state as a non-image capturing state in which the user does not grasp the grip portion 90 nor view the eyepiece 16. In State B, the camera control unit 50 turns off both the rotational operation function and the touch operation function. In this case, resistance against rotation of the dial 302 may be set to be strong (second intensity) so that the dial 302 cannot easily rotate. This is the same for any other state to be described below, in which the rotational operation function is turned off.

State C is a state in which grip is detected but eye proximity is not detected, and the camera control unit 50 determines the state as a state in which the user grasps the grip portion 90 and performs image capturing preparation or various kinds of setting while viewing a live-view image displayed on the display unit 28. In State C, since the user can visually recognize the dial 302 and the display unit 28 and is unlikely to perform a false touch operation, the camera control unit 50 turns off the rotational operation function and turns on the touch operation function. Sensitivity to a touch operation may be increased in a case where sensitivity to a touch operation is decreased instead of turning off the touch operation function in States A and B. This is the same for any other state to be described below, in which the touch operation function is turned on.

FIG. 7B illustrates ON/OFF of the rotational operation function and the touch operation function in a case where attitude detection by the attitude detector 55 and sound detection by the audio detector 91 are enabled in addition to grip detection by the grip detector 92 and eye proximity detection by the eye proximity detector 57.

State D is a moving state in which acceleration equal to or larger than a threshold value is detected by the attitude detector 55, and the camera control unit 50 turns off both the rotational operation function and the touch operation function irrespective of a result of detection by any other detector, for preventing a false operation.

States E, F, G, and H are image capturing states in which acceleration smaller than the threshold value or no acceleration is detected by the attitude detector 55. State E is a state in which a sound level lower than a threshold value is detected by the audio detector 91. The camera control unit 50 determines that the use environment is a silent environment, turns off the rotational operation function, and turns on the touch operation function. Accordingly, the user can perform a touch operation as a silent operation in a case where quietness is required at an art museum, a public place, or the like.

States F, G, and H are states in which a sound level (noise) equal to or higher than the threshold value is detected. State F is a state in which grip and eye proximity are both detected, and State H is a state in which grip is detected but eye proximity is not detected. The camera control unit 50 performs, for States F an H, the same ON/OFF setting as that for States A and C described above, respectively.

State G is a state in which grip and eye proximity are both not detected, and the camera control unit 50 determines the state as an image capturing state based on an acceleration detection result. For example, the state is determined as an image capturing state in which the camera 100 is fixed to a tripod. In State G, since the user can visually recognize the dial 302 and the display unit 28 and is unlikely to perform a false touch operation, the camera control unit 50 turns off the rotational operation function and turns on the touch operation function.

As described above, the camera 100 according to this example can automatically change setting about the rotational operation function and the touch operation function of the sub electronic dial unit 73 in accordance with the state of the camera 100.

The user can perform setting to turn off operation of the shutter 101 and use electronic shutter operation of the image sensor 22 in the still image capturing mode. The user can also set the moving image capturing mode in which a moving image is captured together with sound. In a case of specific setting with which a silent operation is required as described above, the camera control unit 50 performs setting to prioritize a touch operation over a rotational operation irrespective of a detection result of the state of the camera 100 by each above-described detector. More specifically, the camera control unit 50 turns off the rotational operation function and turns on the touch operation function, or increases resistance against a rotational operation and increases sensitivity to a touch operation.

FIG. 8A illustrates a display example of a rotational operation icon 701 in the display unit 28 or the EVF 29 for notifying the user that the rotational operation function is turned on. FIG. 8B illustrates a display example of a touch operation icon 702 for notifying the user that the touch operation function is turned on. In a case where the icons 701 and 702 are displayed, the user can clearly recognize which of a rotational operation and a touch operation is possible on the sub electronic dial unit 73 (dial 302).

Although the electronic dial unit provided in the camera 100 is described above in this example, an electronic dial unit having the same configuration may be mounted on an automobile as the electronic apparatus. In a case where various setting values of an audio, navigation, or air conditioning system are to be changed in the automobile, the rotational operation function that allows a reliable operation with a click feeling of a dial can be turned on in a traveling (driving) state in which the dial should not be viewed. The touch operation function that allows a smooth operation can be turned on in a stopping state. The driving state and the stopping state can be determined based on whether acceleration or brake is turned on or off.

Example 2

For the dial 302 on which a rotational operation and a touch operation are possible, a touch operation is potentially falsely detected in a case where the user unintentionally touches the dial 302 with a finger in or after a rotational operation. Thus, false detection of a touch operation is prevented in Example 2.

FIG. 9 illustrates a section of a sub electronic dial unit 73' in this example in a state in which a thumb 901 of the user touches the outer circumferential surface 302b of the dial 302. In FIG. 9, the same constituent component as in FIG. 3 is denoted by the reference sign as in FIG. 3 and description thereof is omitted.

With the sub electronic dial unit 73' according to this example, not only contact of the thumb 901 with the outer circumferential surface 302b of the dial 302 is detected by the capacitance detector 305a (touch sensor electrode 500) but also the contact area of the thumb 901 on the dial 302 is detected based on the size of capacitance. A distortion sensor 1201 is provided between the upper cover 301 and the shaft portion 302a of the dial 302. The distortion sensor 1201 is disposed between the upper cover 301 and the shaft portion 302a of the dial 302 in the radial direction of the dial 302, is distorted by force (external force) transferred from the shaft portion 302a in a case where the thumb 901 touches the outer circumferential surface 302b of the dial 302, and outputs a signal in accordance with the amount of the distortion. The camera control unit 50 determines, based on the magnitude of the distortion amount indicated by the signal, whether the user is performing a rotational operation or a touch operation onto the dial 302. The capacitance detector 305a and the distortion sensor 1201 correspond to an operation state detector.

Figures 10A, 10B, 11:
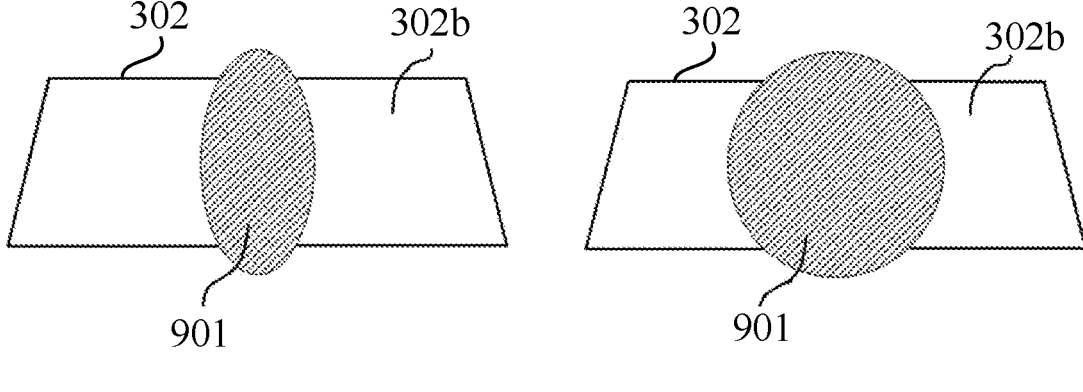
FIGS. 10A and 10B are schematic diagrams illustrating the contact area of a finger on the dial in Example 2.
FIG. 11 illustrate the correspondence between the above-described contact area or external force applied to the dial and a function of the sub electronic dial unit in Example 2.

FIG. 10A schematically illustrates the contact area of the thumb 901 on the dial 302 in a case where the user performs a touch operation onto the outer circumferential surface 302b of the dial 302. FIG. 10B schematically illustrates the contact area of the thumb 901 on the dial 302 in a case where the user performs a rotational operation onto the dial 302.

The contact area of the thumb 901 on the dial 302 and the external force applied to the dial 302 are different between a case where a touch operation is performed on the dial 302 by the thumb 901 and a case where a rotational operation is performed on the dial 302 by the thumb 901. Specifically, the thumb 901 traces the outer circumferential surface 302b of the dial 302 in the touch operation illustrated in FIG. 10A. However, the thumb 901 is pressed against the outer circumferential surface 302b of the dial 302 to stick to the knurled shape in the rotational operation illustrated in FIG. 10B. Thus, in the rotational operation, the contact area of the thumb 901 on the dial 302 is larger than in the touch operation, and the external force applied to the dial 302 is larger as well, and accordingly, the distortion amount of the distortion sensor 1201 disposed between the dial 302 and the upper cover 301 is larger.

In this manner, the camera control unit 50 detects the contact area of the thumb 901 and the magnitude of external force (distortion amount) as the states of an operation onto the dial 302. Then, the camera control unit 50 determines which of a rotational operation and a touch operation the user is going to perform on the dial 302 in accordance with results of the detection, and switches an operation to be detected (setting about a rotational operation and a touch operation). Accordingly, unintentional touch on the dial 302 by the user with a finger in or after a rotational operation can be prevented from being falsely detected as a touch operation. The camera control unit 50 performs such processing in accordance with the computer program.

The camera control unit 50 may perform the operation determination by using both or only one of the contact area and the magnitude of external force.

FIG. 11 illustrates the correspondence between the contact area of a finger on the dial 302 or the magnitude of the external force applied to the dial 302 and ON/OFF of detection of a touch operation and a rotational operation (enablement/disablement of a touch operation and a rotational operation). "Small" of contact area/external force corresponds to a case where the detected contact area or external force is smaller than a first threshold value, and "intermediate" of contact area/external force corresponds to a case where the detected contact area or external force is equal to or larger than the first threshold value and smaller than a second threshold value. In addition, "large" of contact area/external force corresponds to a case where the detected contact area or external force is equal to or larger than the second threshold value.

In a case where at least one of the contact area and the external force is equal to or larger than zero and smaller than the first threshold value, the camera control unit 50 determines that no intentional operation is performed on the dial 302 by the user, and turns off touch operation detection and rotational operation detection. Accordingly, a touch operation can be prevented from being falsely detected in a case where, for example, the user unintentionally touches the dial 302 with a finger in a case where operating an operation member different from the dial 302. Similarly to Example 1, sensitivity to a touch operation may be decreased in place of turning off touch operation detection, and resistance against rotation of the dial 302 may be increased in addition to turning off rotational operation detection.

In a case where at least one of the contact area and the external force is equal to or larger than the first threshold value and smaller than the second threshold value, the camera control unit 50 determines that the user touches the dial 302 with an intention to perform a touch operation, and turns on touch operation detection and turns off rotational operation detection. Similarly to Example 1, sensitivity to a touch operation may be increased in place of turning on touch operation detection.

In a case where at least one of the contact area and the external force is equal to or larger than the second threshold value, the camera control unit 50 determines that the user touches the dial 302 with an intention to perform a rotational operation, and turns off touch operation detection and turns on rotational operation detection. Similarly to Example 1, resistance against rotation of the dial 302 may be decreased in addition to turning on rotational operation detection.

In addition to the above-described determination of a rotational operation and a touch operation based on the contact area and the external force, whether a finger that is conductive or a non-conductive object other than a finger contacts the dial 302 may be determined based on capacitance change detected by the capacitance detector 305a. In a case where contact with a non-conductive object is determined, the camera control unit 50 may turn off rotational operation detection and touch operation detection. Accordingly, false actuation of the camera 100 can be prevented in, for example, a case where a non-conductive object other than a finger in a bag contacts or rotates the dial 302 while the camera 100 is in the bag or a case where clothes contact the dial 302 while the user is hanging the camera 100 from the neck.

Not only rotational operation detection and touch operation detection but also setting options of modes, exposure, and the like, and setting functions of the feed amount and feed speed of a setting value, and the like may be changed in accordance with the contact area and the external force. In a case where the setting functions are to be changed, the setting functions may be changed in accordance with the intensity of a rotational operation or a touch operation by determining a rotational operation or touch operation with which weak external force is applied on the dial or a rotational operation or touch operation with which strong external force is applied on the dial.

This example can prevent false detection of a rotational operation and a touch operation (false operation of the camera 100) due to unintentional contact with the dial 302 by the user, and cause the camera 100 to execute a function in accordance with the intensity of a rotational operation or a touch operation onto the dial 302.

Example 3

Example 3 will be described below. In Example 3, setting about the rotational operation function and the touch operation function is changed in accordance with the number of fingers operating the dial 302. In this example as well, the camera control unit 50 performs such processing in accordance with the computer program.

Figure 12A:
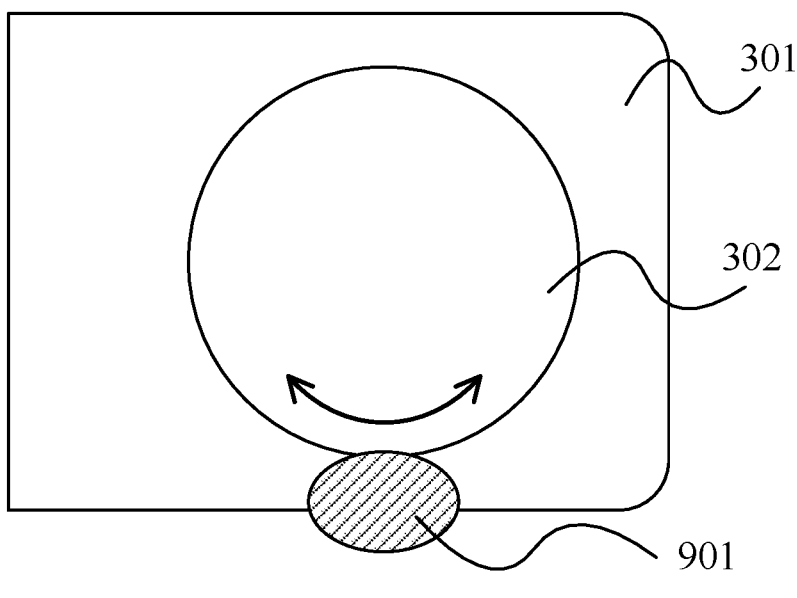
FIGS. 12A and 12B illustrate the status of a rotational operation onto the dial with a finger in Example 3.
Figure 12B:
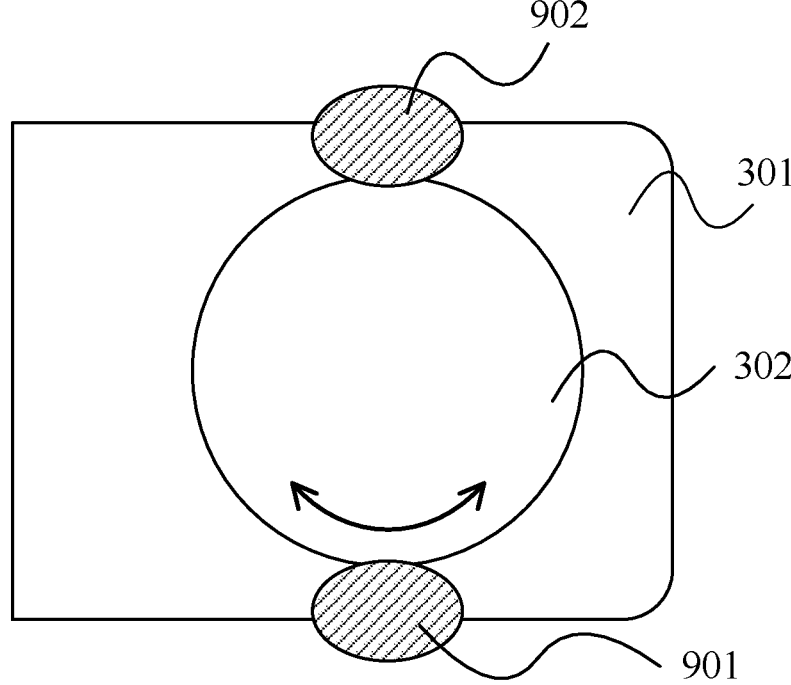

FIG. 12A illustrates a state in which the user touches the dial 302 with one finger (the thumb 901) and performs a rotational operation onto the dial 302. FIG. 12B illustrates a state in which the user touches both sides of the dial 302 in the radial direction with two fingers (the thumb 901 and a forefinger 902) and performs a rotational operation onto the dial 302. The user may perform a rotational operation onto the dial 302 with a larger number (three, for example) of fingers.

The number of fingers touching the dial 302 can be detected by the touch sensor electrode 500. Specifically, the number of fingers touching the dial 302 can be detected based on the number of electrodes the capacitance of which largely changes among a plurality of electrodes (501 to 503) included in the touch sensor electrode 500. Alternatively, the number of fingers touching the dial 302 may be determined based on the total capacitance detected by the touch sensor electrode 500. Moreover, a plurality of kinds of touch sensor electrodes 500 may be provided and outputs from the electrodes may be checked.

The number of fingers performing a slide operation onto the dial 302 may be detected in addition to the case of a rotational operation onto the dial 302.

FIG. 13A illustrates an example of the correspondence between the number of fingers performing a rotational operation onto the dial 302 and a function (operation) of the camera 100. A case where the number of fingers is zero and the dial 302 rotates corresponds to a case where an object (such as the body of the user or a bag) other than a finger contacts the dial 302 and rotates the dial 302 without intention of the user. In this case, the camera control unit 50 causes the camera 100 to execute no function and prevents change in setting values and the like. In a case where a rotational operation is performed on the dial 302 with one finger, the camera control unit 50 changes an exposure correction value. In a case where a rotational operation is performed with two fingers, the camera control unit 50 changes the operation mode of the camera 100 such as the image capturing mode. In a case where a rotational operation is performed with three fingers, the camera control unit 50 powers on or off the camera 100. For example, the camera control unit 50 powers off the camera 100 in a case where the rotational operation is performed in the clockwise direction, or powers on the camera 100 in a case where the rotational operation is performed in the anticlockwise direction.

With such function setting, an operation highly frequently performed by the user, such as change in the exposure correction value can be performed fast with one finger. An operation that is less frequently performed and would cause large influence when falsely performed, such as power on and off can be enabled only when the user intentionally performs a rotational operation onto the dial 302 with a plurality of fingers. Accordingly, this example can improve convenience of the user while preventing false operation.

FIG. 13B illustrates the correspondence between the number of fingers performing a slide operation onto the dial 302 and a function of the camera 100. In this example, the function of the camera 100 is image feed in a case where captured images are played back, and a setting value of image feed is the number of captured images fed per one slide operation (one operation). In a case where the number of fingers is zero, a slide operation cannot be performed and thus image feed is not performed. In a case where a slide operation is performed on the outer circumferential surface 302*b* of the dial 302 with one finger, the camera control unit 50 performs image feed in the units of one image. In a case where a slide operation is performed with two fingers, the camera control unit 50 performs image feed in the units of 10 images. In a case where a slide operation is performed with three fingers, the camera control unit 50 performs image feed in the units of 100 images. With this image feed control, the user can roughly select, with a plurality of fingers, an image capturing scene in which a target image is captured, and can reliably find the target image with one finger. In other words, the user can perform fast search and detailed check of a target image through simple slide operations on one dial 302.

Not only the number of images to be fed but also the change amount of a setting value such as the shutter speed may be changed in accordance with the number of fingers performing a slide operation. Moreover, the change amount of a setting value may be changed in accordance with the number of fingers performing a rotational operation onto the dial 302, and a function of the camera 100 may be changed in accordance with the number of fingers performing a slide operation. The number of fingers performing a rotational operation and a slide operation may be equal to or larger than three and may be, for example, four.

A function (operation) of the camera 100 in accordance with relative motion of two fingers performing a slide operation onto the dial 302 will be described below with reference to FIGS. 14A to 14C. Each arrow in the drawings represents the slide direction of a finger performing a slide operation. The following description will be made on a function of the camera 100 related to captured image playback.

Figures 14A, 14B, 14C:
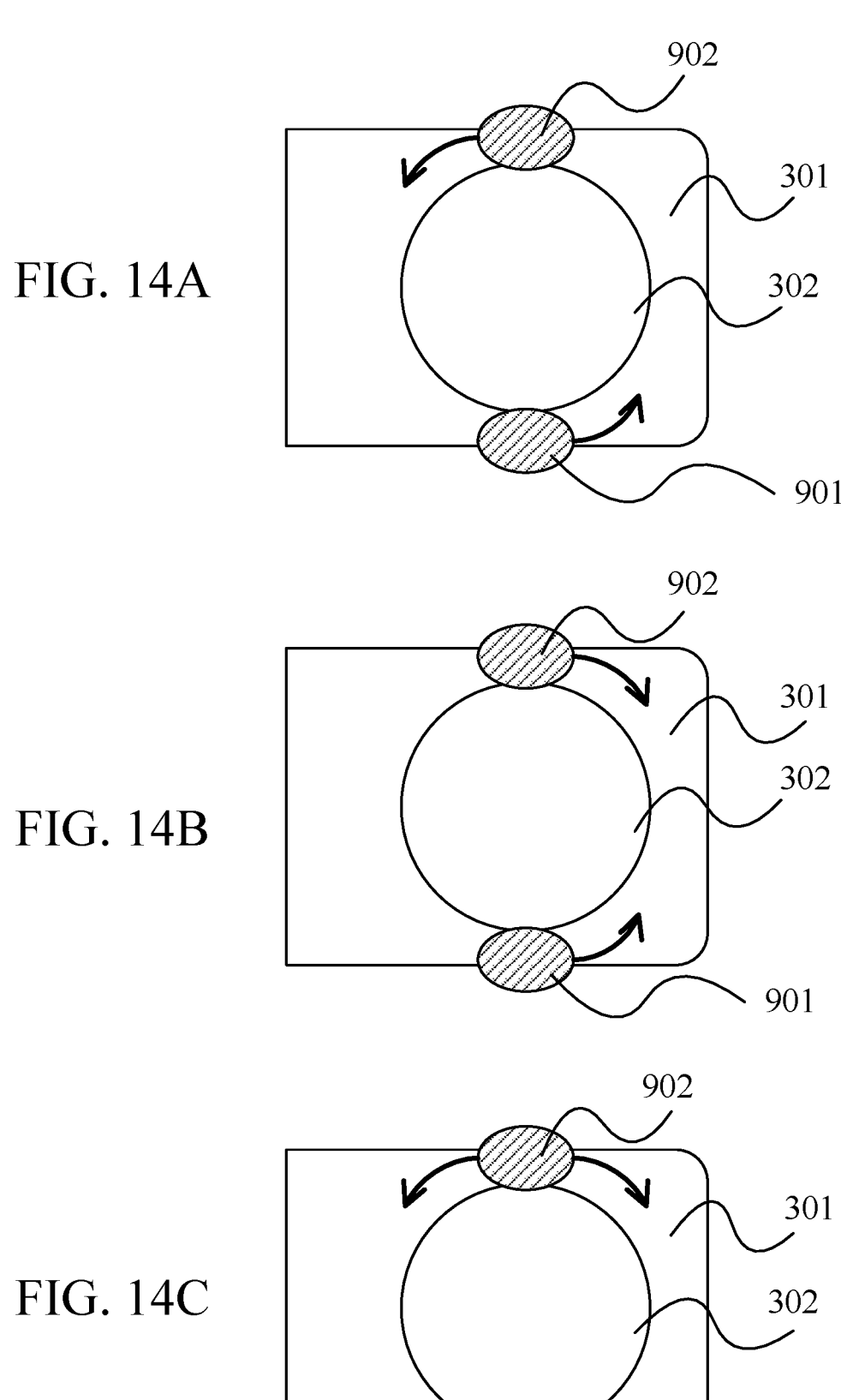
FIGS. 14A, 14B, and 14C illustrate examples of a touch operation onto the dial in Example 3.

FIG. 14A illustrates a case where the thumb 901 and the forefinger 902 are both slid in the anticlockwise direction. In this case, the camera control unit 50 performs image feed. The camera control unit 50 switches the direction of image feed in accordance with the slide direction of the thumb 901 and the forefinger 902 (the clockwise direction or the anticlockwise direction).

FIG. 14B illustrates a case where the thumb 901 is slid in the anticlockwise direction and the forefinger 902 is slid in the clockwise direction, in other words, a pinch-in operation is performed so that the thumb 901 and the forefinger 902 approach each other. In this case, the camera control unit 50 performs scaling-down processing of scaling down a playback image. In a case where a pinch-out operation is performed so that the thumb 901 and the forefinger 902 having approached each other are slid in directions opposite the arrows, in other words, the thumb 901 and the forefinger 902 are separated from each other, the camera control unit 50 performs scale-up processing of scaling up the playback image as a function different from that in the pinch-in operation. In the state of the diagram, in a case where the thumb 901 is slid in the clockwise direction and the forefinger 902 is slid in the anticlockwise direction, as well, the camera control unit 50 scales down the playback image as the two fingers approach each other, and scales up the playback image as the two fingers become separated from each other. In this manner, the playback magnification of the playback image is changed in accordance with the distance between the two fingers, and thus the user can perform an intuitive operation.

FIG. 14C illustrates a case where the thumb 901 does not move while touching the dial 302 but the forefinger 902 slides in the clockwise direction or the anticlockwise direction. In this case, the camera control unit 50 sets the rating of a playback image as a specific function of the camera 100. Specifically, the rating is increased in a case where the forefinger 902 slides in the clockwise direction, and the rating is decreased in a case where the forefinger 902 slides in the anticlockwise direction. Typically, in rating, a rating indicator such as a star mark (*) is displayed together with a playback image, and the degree of rating is represented by the number of rating indicators. In this example, the number of rating indicators is increased or decreased in accordance with the direction in which a finger slides, and thus the user can perform an intuitive operation.

In this manner, the camera 100 can execute various functions related to image playback in accordance with a slide operation with at least one of two fingers contacting the dial 302. The camera 100 is not limited to the case of two fingers and functions related to image playback but may execute various functions in accordance with the relative positional relation among a larger number of fingers.

Figure 15A:
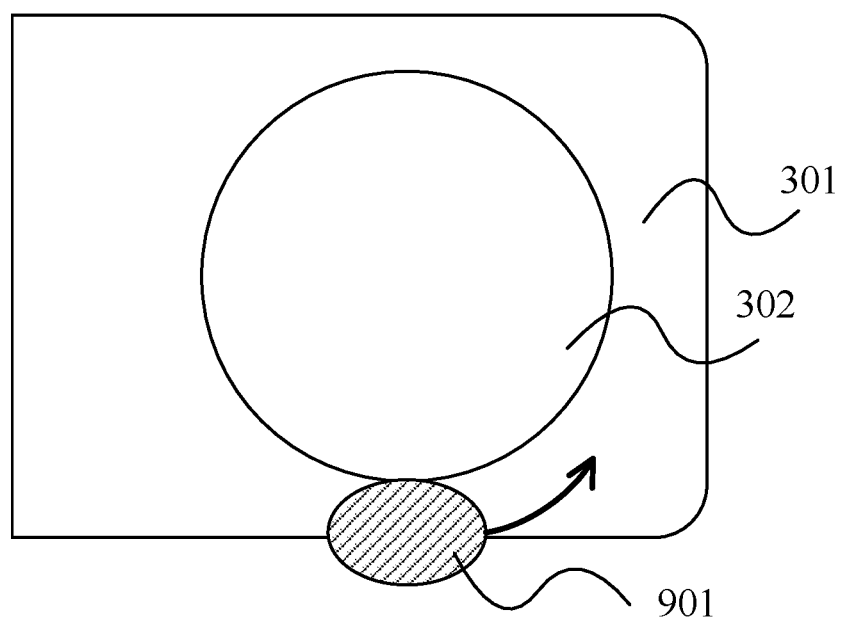
FIGS. 15A and 15B illustrate other examples of a touch operation onto the dial in Example 3.

FIG. 15A illustrates a state in which a slide operation is performed on the dial 302 with the thumb 901. In this example of the diagram, a slide operation is performed in the anticlockwise direction as illustrated with the arrow. In the example, the camera 100 is set to the playback mode in which captured images are played back, and image feed is performed in the units of 10 images in a direction in accordance with the direction of a slide operation with one finger.

Figure 15B:
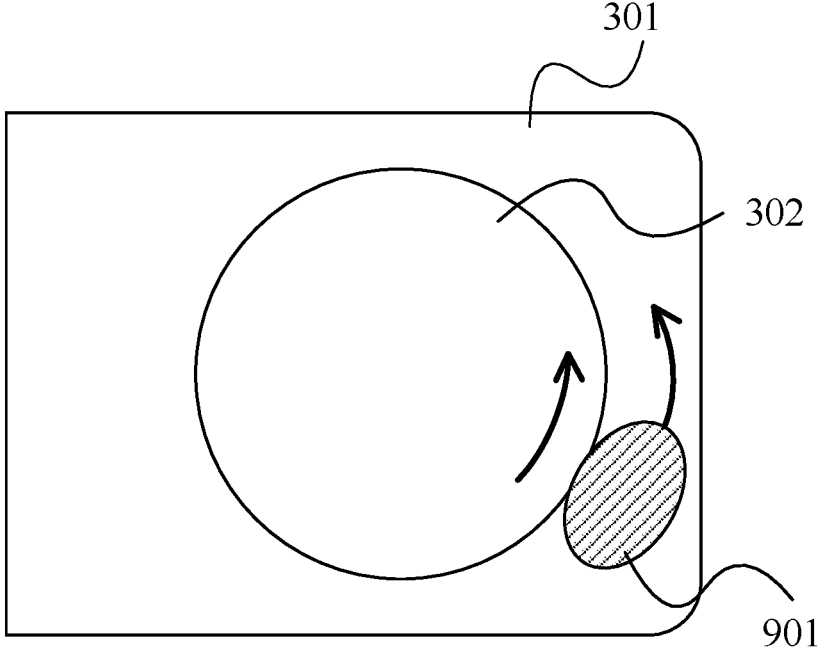

FIG. 15B illustrates a state in which a rotational operation is performed on the dial 302 in the anticlockwise direction without removing the thumb 901 from the dial 302 (while contact with the thumb 901 is detected) after the slide operation illustrated in FIG. 15A. In this case, the camera control unit 50 does not perform change in the exposure correction value, which is set for a rotational operation with one finger as illustrated in 13A, but performs image feed in the units of one image per click. The user can roughly feed playback images by performing a slide operation and can reliably feed playback images one by one by performing a rotational operation in the units of clicks thereafter. In this case, the dial 302 does not need to be grasped differently as in the above-described case of changing the number of images to be fed by changing the number of fingers, and thus the number of images to be fed can more easily changed.

In this manner, in a case where a slide operation and a rotational operation are continuously performed without removing a plurality of fingers from the dial 302, the camera control unit 50 applies a function of the camera 100, which is set for the slide operation, to the rotational operation as well and does not execute a function originally set for the rotational operation. In other words, the user performs a rotational operation without changing fingers touching the dial 302 for a first slide operation and the number of fingers, thereby causing the camera 100 to perform a function set for a slide operation with a different number of fingers. Accordingly, simplicity and immediacy of an operation improve.

The user may perform a slide operation without removing fingers after performing a rotational operation onto the dial 302. In this case, the camera control unit 50 applies a function set for the rotational operation to the slide operation as well and changes the change amount of a setting value in accordance with the slide operation. Accordingly, this example can smoothly perform such an operation that a setting value is largely changed through a slide operation after the setting value is finely changed through a rotational operation.

The above-described operations may be performed on the dial 302 with a plurality of fingers. The camera 100 may execute a function other than image feed for the above-described operations.

Although the electronic dial unit provided in the camera 100 is described above in Examples 2 and 3, an electronic dial unit having the same configuration is applicable to various electronic apparatuses such as an automobile, an audio instrument, and a medical instrument. For example, with an electronic dial unit mounted on an automobile, vehicle speed and inter-vehicular distance in cruise control or temperature and air volume in automatic air conditioning can be set through a rotational operation and a touch operation onto a dial. With an electronic dial unit mounted on an audio instrument, sound volume can be roughly and finely adjusted through a rotational operation and a touch operation onto a dial.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

Each example can provide an electronic apparatus capable of automatically changing setting about a rotational operation and a touch operation onto one operation member.

What is claimed is:

1. An image capturing electronic apparatus comprising:
an operation dial that is rotationally operable;
a rotational operation sensor configured to detect a rotational operation onto the operation dial;
a touch operation sensor configured to detect a touch operation onto the operation dial;
a state detection sensor configured to detect at least two states of the image capturing electronic apparatus, among posture, motion, presence or absence of an eyepiece, volume of sound around the image capturing electronic apparatus, and presence or absence of gripping;
a memory storing instructions; and
a processor configured to execute the instructions to:
execute a function in accordance with the rotational operation and the touch operation, and
change a setting about the rotational operation and the touch operation in accordance with a combination of detection results of the at least two states.

2. The image capturing electronic apparatus according to claim 1, wherein the processor changes setting about enablement and disablement of the rotational operation and the touch operation in accordance with the combination of detection results of the at least two states.

3. The image capturing electronic apparatus according to claim 2, further comprising a resistance generation click mechanism configured to generate resistance against the rotational operation, wherein the processor changes setting about intensity of the resistance between a case where the rotational operation is enabled and a case where the rotational operation is disabled.

4. The image capturing electronic apparatus according to claim 1, wherein, in accordance with the combination of detection results of the at least two states, the processor changes setting about enablement and disablement of the rotational operation and changes setting about sensitivity of the touch operation sensor to the touch operation.

5. The image capturing electronic apparatus according to claim 1, wherein the processor is configured to set both the rotational operation and the touch operation to be disabled when a detection result of the posture indicates that the image capturing electronic apparatus is in a moving state, irrespective of detection results of any other states, and wherein the detected at least two states of the image capturing apparatus include at least one of whether a user grasps the image capturing electronic apparatus, volume of sound in use environment of the image capturing electronic apparatus, attitude or motion of the image capturing electronic apparatus, and whether inside or an outer surface of the image capturing electronic apparatus is viewed by the user.

6. The image capturing electronic apparatus according to claim 1, wherein the touch operation is a slide operation onto the operation dial.

7. The image capturing electronic apparatus according to claim 1, wherein the processor performs setting with which the touch operation is prioritized over the rotational operation irrespective of the combination of detection results of the at least two states in a case where specific setting is performed on the image capturing electronic apparatus.

8. The image capturing electronic apparatus according to claim 7, wherein the image capturing electronic apparatus includes an image a mechanical shutter configured to control an exposure time of the image sensor performing an imaging, and wherein the specific setting is setting for using an electronic shutter of the image sensor instead of using the mechanical shutter.

9. The image capturing electronic apparatus according to claim 7, wherein the specific setting is setting for performing moving image capturing.

10. The image capturing electronic apparatus according to claim 1, further comprising a display device configured to display an enabled one of the rotational operation and the touch operation.

11. An automobile electronic apparatus comprising:

an operation dial that is rotationally operable;

a rotational operation sensor configured to detect a rotational operation of the operation dial;

a touch operation sensor configured to detect a touch operation on the operation dial;

a control unit configured to execute a function in accordance with the rotational operation and the touch operation;

a state detection sensor configured to detect a driving state and a stopping state of the automobile electronic apparatus;

a memory storing instructions; and a processor configured to change a setting about the rotational operation and the touch operation in accordance with whether the automobile electronic apparatus is in the driving state or in the stopping state.

12. An electronic apparatus comprising:

an operation dial that is rotationally operable;

a rotational operation sensor configured to detect a rotational operation onto the operation dial;

a touch operation detection sensor configured to detect a touch operation onto the operation dial;

an operation state detection sensor configured to detect, as an operation state of the operation dial, at least one of contact area of a finger on the operation dial, magnitude of external force applied to the operation dial, and the number of fingers operating the operation dial;

a memory storing instructions; and a processor configured to execute the instructions to:

execute a function in accordance with the rotational operation and the touch operation, and change setting about the rotational operation and the touch operation in accordance with the operation state.

13. The electronic apparatus according to claim 12, wherein the processor changes setting of enablement of the rotational operation and the touch operation in accordance with the operation state.

14. The electronic apparatus according to claim 13, further comprising a resistance generation click mechanism configured to generate resistance against the rotational operation, wherein the processor changes setting about intensity of the resistance between a case where the rotational operation is enabled and a case where the rotational operation is disabled.

15. The electronic apparatus according to claim 12, wherein the processor changes setting about enablement and disablement of the rotational operation and changes setting about sensitivity of the touch operation sensor to the touch operation in accordance with the operation state.

16. The electronic apparatus according to claim 12, wherein the touch operation is a slide operation onto the operation dial.

17. The electronic apparatus according to claim 12, wherein the processor changes, based on the number of fingers, setting about a function to be executed by the electronic apparatus in accordance with at least one of the rotational operation and the touch operation.

18. The electronic apparatus according to claim 12, wherein the processor changes a setting value in the electronic apparatus in accordance with at least one of the rotational operation and the touch operation, and changes setting about a change amount of the setting value per one operation in accordance with the number of fingers.

19. The electronic apparatus according to claim 12, wherein the processor detects, through the touch operation sensor, increase or decrease of a distance between a plurality of fingers performing the touch operation onto the operation dial and executes a different function in accordance with the increase or decrease of the distance.

20. The electronic apparatus according to claim 12, wherein the processor executes a specific function in accordance with detection of a finger moving while contacting the operation dial and another finger not moving while contacting the operation dial through the touch operation sensor.

21. The electronic apparatus according to claim 12, wherein, in a case where one of the rotational operation and the touch operation is followed by another operation without detecting separation of a finger from the operation dial through the touch operation sensor, the processor changes, in accordance with one operation of the other operation, a setting value of the electronic apparatus, which is changed through the one operation, by a change amount different from a change amount per one operation of the one operation.

22. A method of controlling an image capturing electronic apparatus including an operation dial for a rotational operation and a touch operation, the method comprising the steps of:

detecting at least two states of the image capturing electronic apparatus, among posture, motion, presence or absence of an eyepiece, volume of sound around the image capturing electronic apparatus, and presence or absence of gripping; and changing setting about the rotational operation and the touch operation in accordance with the combination of detection results of the at least two states.

23. A method of controlling an electronic apparatus including an operation dial for a rotational operation and a touch operation, the method comprising the steps of:

detecting, as an operation state of the operation dial, at least one of contact area of a finger on the operation dial, magnitude of external force applied to the operation dial, and the number of fingers operating the operation dial; and changing setting about the rotational operation and the touch operation in accordance with the operation state.

24. A method of controlling an automobile electronic apparatus including an operation dial for a rotational operation and a touch operation, the method comprising the steps of:

detecting a driving state and a stopping state of the automobile electronic apparatus; and changing a setting about the rotational operation and the touch operation in accordance with whether the automobile electronic apparatus is in the driving state or in the stopping state.

\* \* \* \* \*